(12) United States Patent
Namgung et al.

(10) Patent No.: US 9,946,510 B2
(45) Date of Patent: Apr. 17, 2018

(54) MOBILE TERMINAL AND METHOD FOR CONTROLLING THE SAME

(71) Applicant: LG ELECTRONICS INC., Seoul (KR)

(72) Inventors: Seol Namgung, Seoul (KR); Jieun Lee, Seoul (KR); Sungyoung Yoon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 505 days.

(21) Appl. No.: 14/321,601

(22) Filed: Jul. 1, 2014

(65) Prior Publication Data

US 2015/0065200 A1    Mar. 5, 2015

(30) Foreign Application Priority Data

Sep. 4, 2013 (KR) .................. 10-2013-0106043

(51) Int. Cl.
| | | |
|---|---|---|
| G06F 3/048 | (2013.01) | |
| G06F 3/16 | (2006.01) | |
| G06F 3/041 | (2006.01) | |
| G06F 3/0354 | (2013.01) | |
| G06F 3/038 | (2013.01) | |
| G06F 3/0488 | (2013.01) | |
| H04M 1/725 | (2006.01) | |
| G06F 3/01 | (2006.01) | |

(52) U.S. Cl.
CPC ............ *G06F 3/167* (2013.01); *G06F 3/016* (2013.01); *G06F 3/038* (2013.01); *G06F 3/03545* (2013.01); *G06F 3/0416* (2013.01); *G06F 3/0488* (2013.01); *H04M 1/72522* (2013.01)

(58) Field of Classification Search
None
See application file for complete search history.

(56) References Cited

U.S. PATENT DOCUMENTS 7,392,469 B1 * 6/2008 Bailin .................. G06F 17/241
                                                                 715/201
2001/0038383 A1    11/2001 Ericson et al.

(Continued)

FOREIGN PATENT DOCUMENTS

| EP | 2607994 | 6/2013 |
|---|---|---|
| WO | 2007/101089 | 9/2007 |

OTHER PUBLICATIONS

European Patent Office Application Serial No. 14002492.8, Search Report dated May 15, 2015, 11 pages.

(Continued)

*Primary Examiner* — Thanh Vu
(74) *Attorney, Agent, or Firm* — Lee, Hong, Degerman, Kang & Waimey

(57) ABSTRACT

The present invention relates to a mobile terminal enabling a user to more conveniently use the terminal and a method of controlling therefor. According to at least one of embodiments of the present invention, a voice data can be recorded using an attachable/detachable stylus pen and the recorded voice data can be easily stored and managed by the stylus pen. And, according to at least one of embodiments of the present invention, a virtual hand writing memo written by the attachable/detachable stylus pen can be easily stored and managed by the stylus pen.

18 Claims, 27 Drawing Sheets

(56) References Cited

U.S. PATENT DOCUMENTS

| | | | |
|---|---|---|---|
| 2002/0031243 A1 | 3/2002 | Schiller et al. | |
| 2003/0055655 A1 | 3/2003 | Suominen | |
| 2005/0210394 A1* | 9/2005 | Crandall | H04L 12/1831 715/752 |
| 2007/0208567 A1* | 9/2007 | Amento | G10L 15/22 704/270 |
| 2010/0056220 A1* | 3/2010 | Oh | G06F 1/1616 455/566 |
| 2010/0162182 A1* | 6/2010 | Oh | G06F 3/04883 715/863 |
| 2011/0153324 A1* | 6/2011 | Ballinger | G10L 15/30 704/235 |
| 2013/0154956 A1* | 6/2013 | Tudosoiu | G06F 3/03545 345/173 |
| 2014/0168176 A1* | 6/2014 | Nowatzyk | G06F 3/03545 345/179 |

OTHER PUBLICATIONS

European Patent Office Application Serial No. 14002492.8, Search Report dated Jan. 22, 2015, 5 pages.
European Patent Office Application No. 14002492.8, Search Report dated Sep. 5, 2016, 6 pages.

\* cited by examiner

FIG. 10
play is stopped
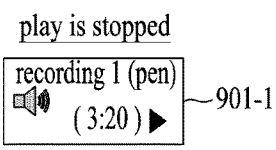 ~901-1
play is stopped
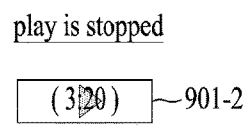 ~901-2
play is stopped
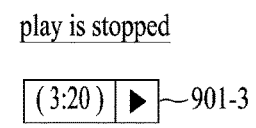 ~901-3
playing
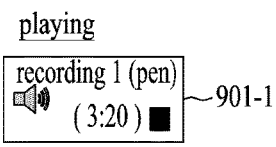 ~901-1
playing
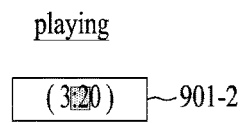 ~901-2
playing
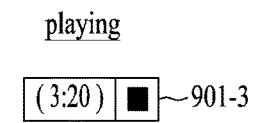 ~901-3
( a )    ( b )    ( c )

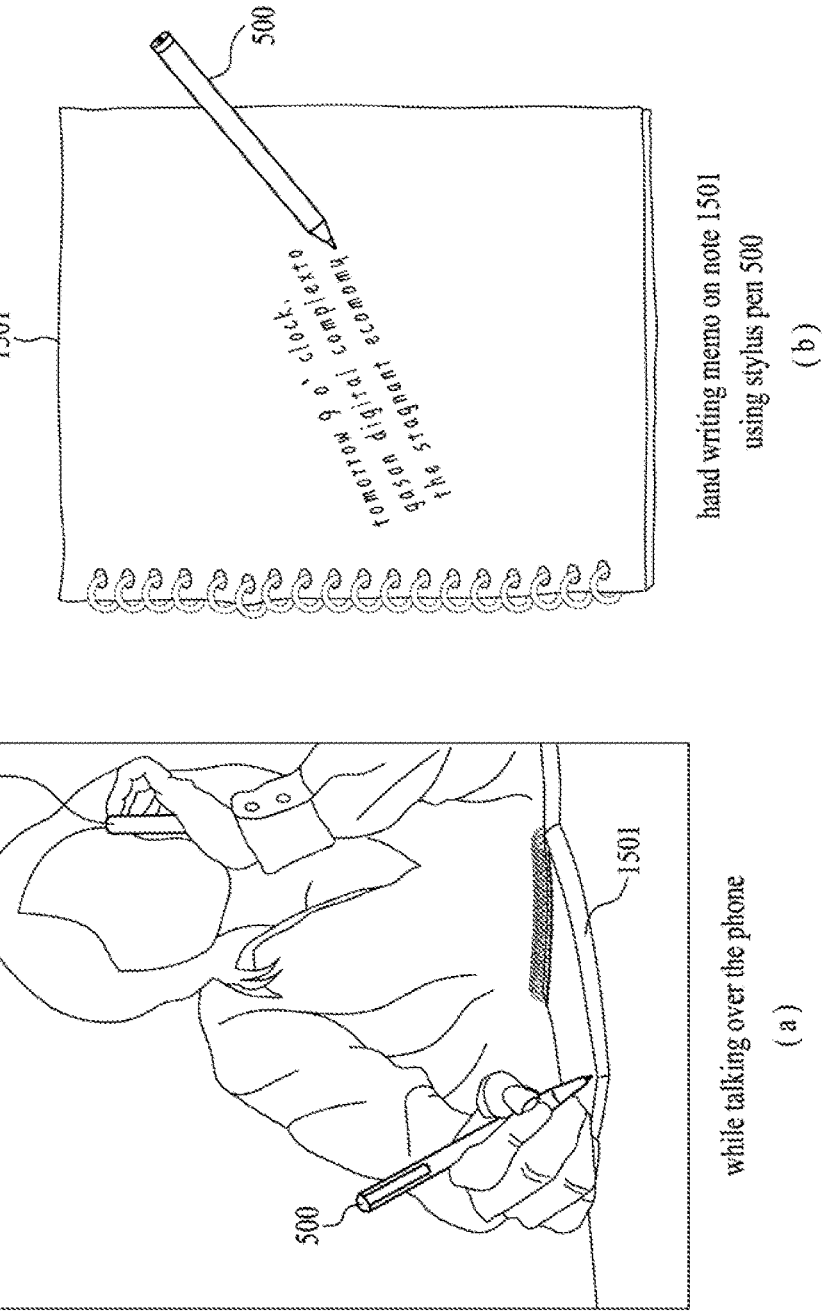

hand writing memo on note 1501
using styus pen 500
(a)

example of storing method
according to hand writing memo
(b)

FIG. 22B

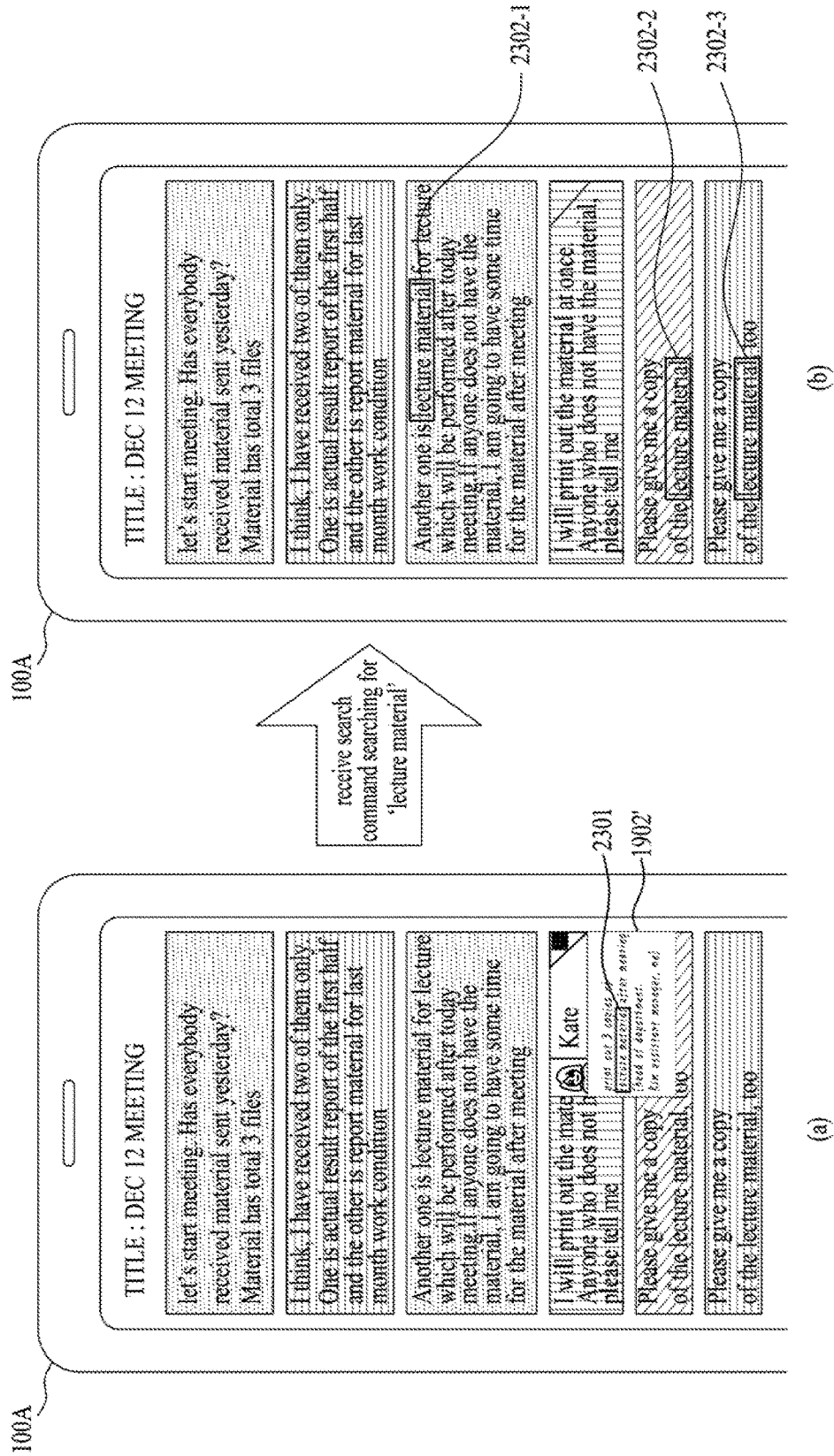

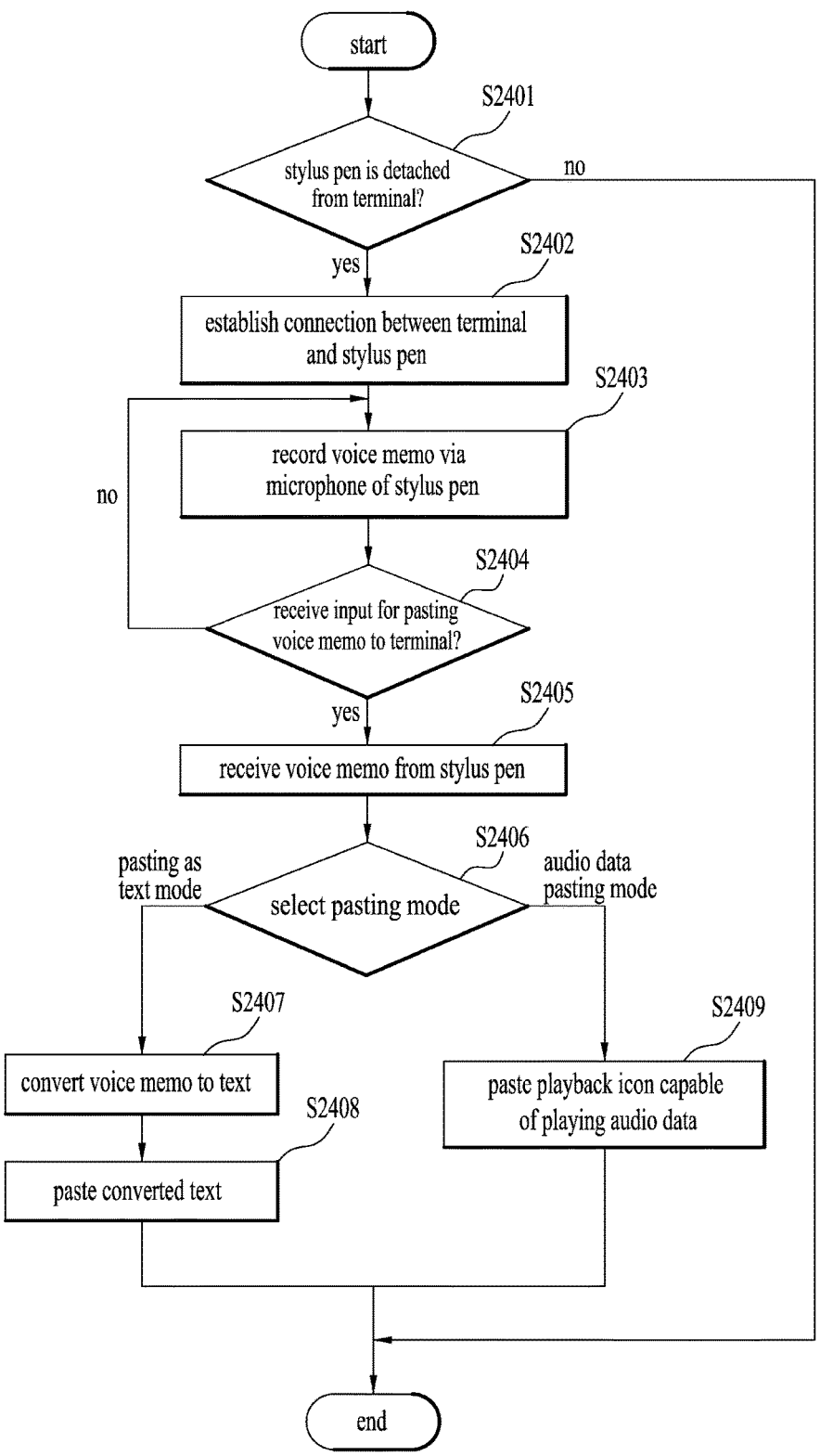

MOBILE TERMINAL AND METHOD FOR CONTROLLING THE SAME

CROSS-REFERENCE TO RELATED APPLICATIONS

Pursuant to 35 U.S.C. § 119(a), this application claims the benefit of earlier filing date and right of priority to Korean Application No. 10-2013-0106043, filed on Sep. 4, 2013, the contents of which are hereby incorporated by reference herein in their entirety.

BACKGROUND OF THE INVENTION

Field of the Invention

The present invention relates to a mobile terminal enabling a user to more conveniently use the terminal and a method of controlling therefor.

Discussion of the Related Art

A mobile terminal is a device which may be configured to perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals according to a presence or non-presence of mobility. And, the mobile terminals can be further classified into handheld terminals and vehicle mount terminals according to availability for hand-carry.

There are ongoing efforts to support and increase the functionality of mobile terminals. Such efforts include software and hardware improvements, as well as changes and improvements in the structural components which form the mobile terminal.

In particular, according to a recent research and study on a method of efficiently controlling a terminal, the research and the study are mainly concerning on a method of making a control input of a user to be more intuitive. A representative means of the intuitive control input may include a stylus pen. The stylus pen is a touch input means touching a touch screen of the terminal. As a size of the touch screen installed in the terminal getting bigger, the utility of the stylus pen is increasing. In order to meet the increasing utility of the stylus pen, a study on methods of extensively controlling the use of the stylus pen is required.

SUMMARY OF THE INVENTION

Accordingly, the present invention is directed to an apparatus and method thereof that substantially obviate one or more problems due to limitations and disadvantages of the related art.

The present invention is proposed to satisfy the aforementioned necessity. One object of the present invention is to provide a mobile terminal enabling a stylus pen to be used as a recording and memo aid tool as well as a touch input means and a method of controlling therefor.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal includes an attachable/detachable stylus pen equipped with a microphone, a touch screen configured to output an execution screen of a prescribed application, a wireless communication unit configured to receive a voice signal recorded by the microphone in a state that the stylus pen is detached, and if a prescribed position of the execution screen of the prescribed application is selected by the stylus pen, a controller configured to control the touch screen to display at least a part of the received voice signal in the selected prescribed position as a text.

To further achieve these objects and other advantages and in accordance with the purpose of the invention, as embodied and broadly described herein, a method of controlling a mobile terminal equipped with an attachable/detachable stylus pen equipped with a microphone, a touch screen and a wireless communication unit includes the steps of outputting an execution screen of a prescribed application via the touch screen, receiving a voice signal recorded by the microphone via the wireless communication unit in a state that the stylus pen is detached, and if a prescribed position of the execution screen of the prescribed application is selected by the stylus pen, controlling the touch screen to display at least a part of the received voice signal in the selected prescribed position as a text.

To further achieve these objects and other advantages and in accordance with the purpose of the invention, as embodied and broadly described herein, a mobile terminal includes an attachable/detachable stylus pen equipped with a tracking sensor, a wireless communication unit, and a controller configured to establish a session to perform a phone call with a prescribed counterpart via the wireless communication unit, if a virtual hand writing memo of a user, which is detected by the tracking sensor of the attachable/detachable stylus pen, is received while the phone call is performed, the controller configured to store the received virtual hand writing memo using a prescribed application.

To further achieve these objects and other advantages and in accordance with the purpose of the invention, as embodied and broadly described herein, a method of controlling a mobile terminal equipped with an attachable/detachable stylus pen equipped with a tracking sensor and a wireless communication unit includes the steps of establishing a session to perform a phone call with a prescribed counterpart via the wireless communication unit and if a virtual hand writing memo of a user, which is detected by the tracking sensor of the attachable/detachable stylus pen, is received while the phone call is performed, storing the received virtual hand writing memo using a prescribed application.

It is to be understood that both the foregoing general description and the following detailed description of the present invention are exemplary and explanatory and are intended to provide further explanation of the invention as claimed.

BRIEF DESCRIPTION OF THE DRAWINGS

The above and other aspects, features, and advantages of the present invention will become more apparent upon consideration of the following description of preferred embodiments, taken in conjunction with the accompanying drawing figures.

FIG. 10 is a diagram for examples of a playback icon according to one embodiment of the present invention;

FIG. 15A and FIG. 15B are diagrams for an example of a method of writing a memo using a stylus pen 500 while talking over the phone according to one embodiment of the present invention;

FIG. 22A-FIG. 23 are diagrams for a method of sharing a voice/hand writing memo on minutes according to one embodiment of the present invention;

FIG. 24 is a flowchart for a method of storing a voice memo according to one embodiment of the present invention;

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The present invention can be applicable to a various types of terminals. Examples of such terminals include mobile terminals, such as mobile phones, user equipment, smart phones, mobile computers, digital broadcast terminals, personal digital assistants, portable multimedia players (PMP) and navigators.

Figure 1:
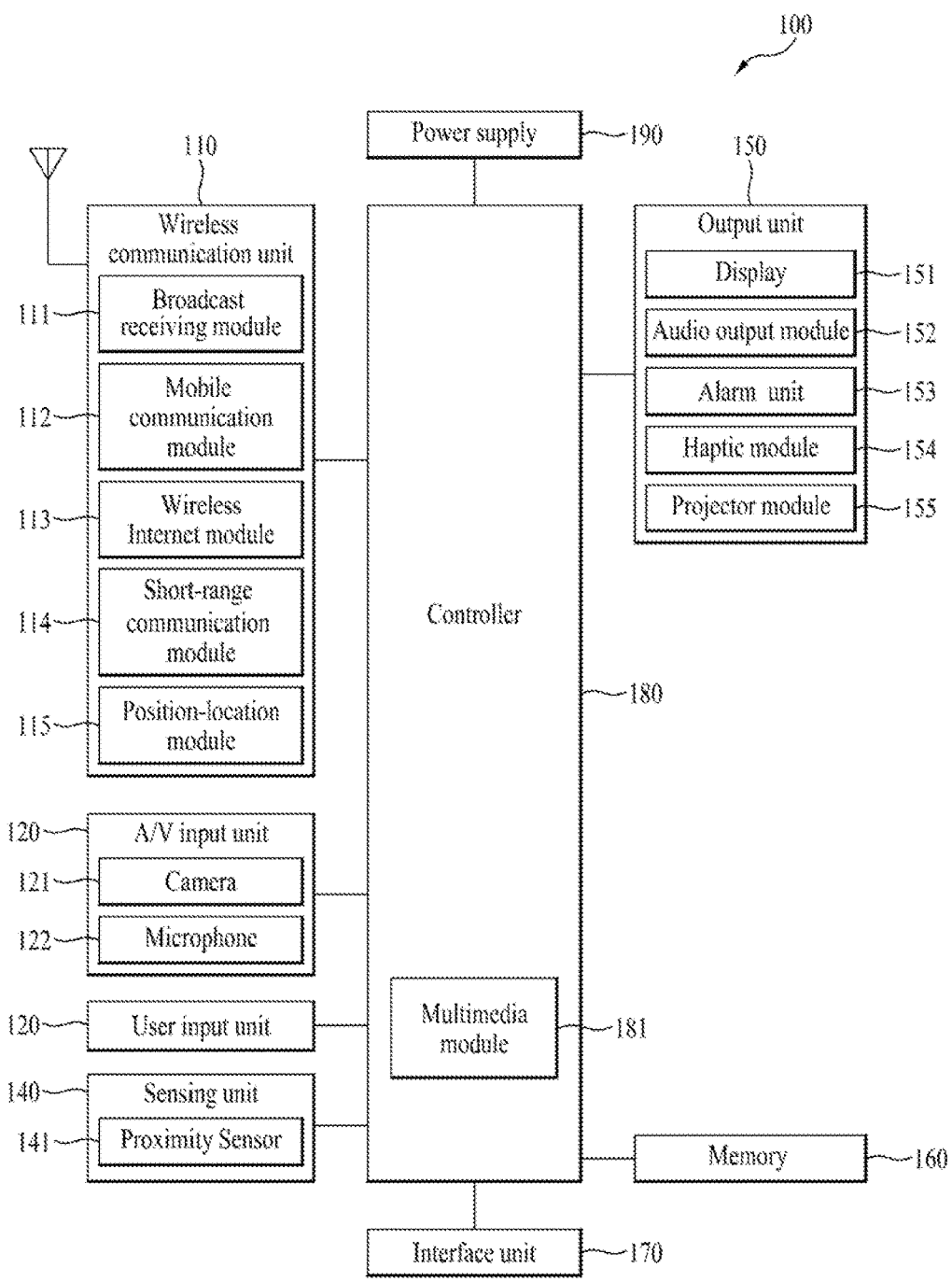
FIG. 1 is a block diagram of a mobile terminal according to one embodiment of the present invention.

FIG. 1 is a block diagram of a mobile terminal 100 in accordance with an embodiment of the present invention. FIG. 1 shows the mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel.

The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

At least two broadcast receiving modules 111 can be provided to the mobile terminal 100 in pursuit of simultaneous receptions of at least two broadcast channels or broadcast channel switching facilitation.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), DVB-CBMS, OMA-BCAST, the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.) via a mobile network such as GSM (Global System for Mobile communications), CDMA (Code Division Multiple Access), WCDMA (Wideband CDMA) and so on. Such wireless signals may represent audio, video, and data according to text/multimedia message transceivings, among others.

The wireless internet module 113 supports Internet access for the mobile terminal 100. This module may be internally or externally coupled to the mobile terminal 100. In this case, the wireless Internet technology can include WLAN (Wireless LAN) (WiFi), Wibro (Wireless broadband), Wimax (World Interoperability for Microwave Access), HSDPA (High Speed Downlink Packet Access), GSM, CDMA, WCDMA, LTE (Long Term Evolution) etc.

Wireless internet access by Wibro, HSPDA, GSM, CDMA, WCDMA, LTE or the like is achieved via a mobile communication network. In this aspect, the wireless internet module 113 configured to perform the wireless internet access via the mobile communication network can be understood as a sort of the mobile communication module 112.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

According to the current technology, the GPS module 115 is able to precisely calculate current 3-dimensional position information based on at least one of longitude, latitude and altitude and direction (or orientation) by calculating distance information and precise time information from at least three satellites and then applying triangulation to the calculated information. Currently, location and time information are calculated using three satellites, and errors of the calculated location position and time information are then amended using another satellite. Besides, the GPS module 115 is able to calculate speed information by continuously calculating a real-time current location.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. And, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100, and free-falling of the mobile terminal 100. As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display 151, an audio output module 152, an alarm unit 153, a haptic module 154, a projector module 155 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display 151 can be implemented in the optical transmittive type as well. In this configuration, a user is able to see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In case that the display 151 and a sensor for detecting a touch action (hereinafter called 'touch sensor') configures a mutual layer structure (hereinafter called 'touchscreen'), it is able to use the display 151 as an input device as well as an output device. In this case, the touch sensor can be configured as a touch film, a touch sheet, a touchpad or the like.

The touch sensor can be configured to convert a pressure applied to a specific portion of the display 151 or a variation of a capacitance generated from a specific portion of the display 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

Referring to FIG. 1, a proximity sensor (141) can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. And, the projector module 155 is able to display an image, which is identical to or partially different at least from the image displayed on the display unit 151, on an external screen or wall according to a control signal of the controller 180.

In particular, the projector module 155 can include a light source (not shown in the drawing) generating light (e.g., laser) for projecting an image externally, an image producing means (not shown in the drawing) for producing an image to output externally using the light generated from the light source, and a lens (not shown in the drawing) for enlarging to output the image externally in a predetermined focus distance. And, the projector module 155 can further include a device (not shown in the drawing) for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module 151.

Preferably, the projector module 155 can be provided in a length direction of a lateral, front or backside direction of the mobile terminal 100. And, it is understood that the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures (or photo), moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern (or image) recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2:
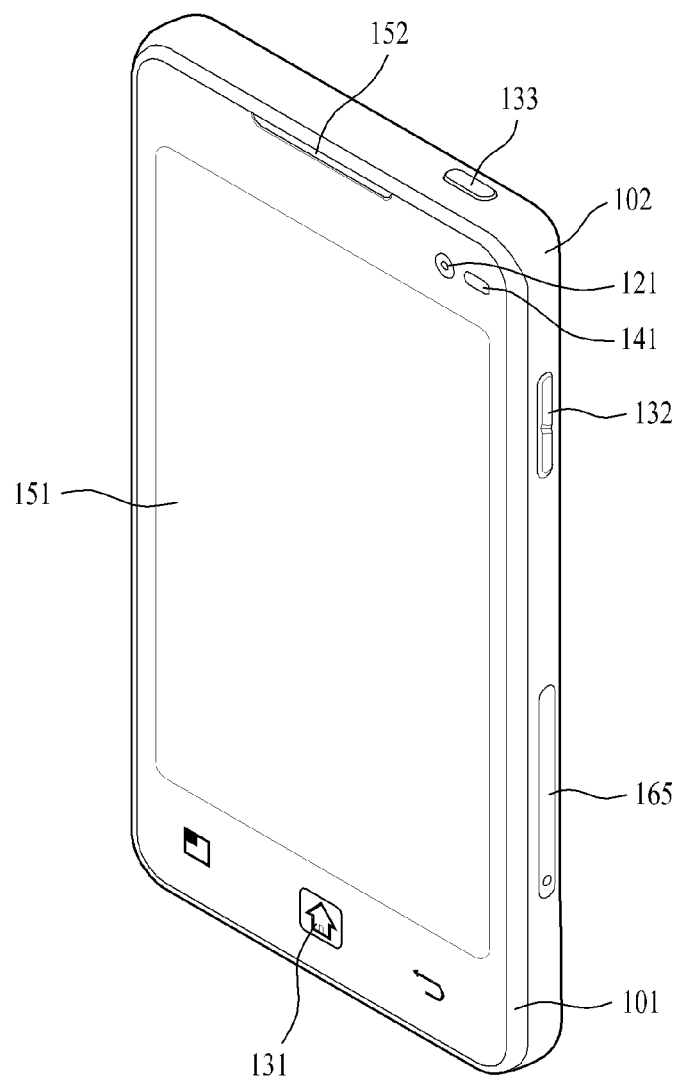
FIG. 2 is a front perspective diagram for one example of a mobile or portable terminal according to the present invention.

FIG. 2 is a front perspective diagram of a mobile terminal according to one embodiment of the present invention.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2, the mobile terminal 100 includes a case (casing, housing, cover, etc.) configuring an exterior thereof. In the present embodiment, the case can be divided into a front case 101 and a rear case 102. Various electric/electronic parts are loaded in a space provided between the front and rear cases 101 and 102. Optionally, at least one middle case can be further provided between the front and rear cases 101 and 102 in addition.

The cases 101 and 102 are formed by injection molding of synthetic resin or can be formed of metal substance such as stainless steel (STS), titanium (Ti) or the like for example.

A display 151, an audio output unit 152, a camera 121, user input units 130/131 and 132, a microphone 122, an interface 180 and the like can be provided to the terminal body, and more particularly, to the front case 101.

The display 151 occupies most of a main face of the front case 101. The audio output unit 151 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. And, the input unit 130 is able to include a plurality of manipulating units 131 and 132. The manipulating units 131 and 132 can be named a manipulating portion and may adopt any mechanism of a tactile manner that enables a user to perform a manipulation action by experiencing a tactile feeling.

Content inputted by the first or second manipulating unit 131 or 132 can be diversely set. For instance, such a command as start, end, scroll and the like is inputted to the first manipulating unit 131. And, a command for a volume adjustment of sound outputted from the audio output unit 152, a command for a switching to a touch recognizing mode of the display 151 or the like can be inputted to the second manipulating unit 132.

Figure 3:
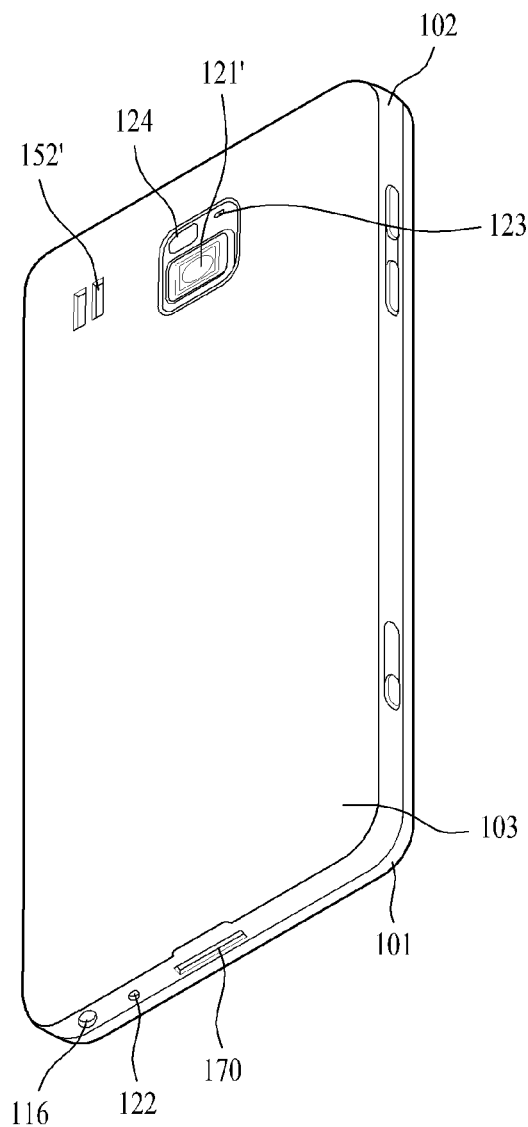
FIG. 3 is a rear perspective diagram of the mobile terminal shown in FIG. 2.

FIG. 3 is a perspective diagram of a backside of the terminal shown in FIG. 2.

Referring to FIG. 3, a camera 121' can be additionally provided to a backside of the terminal body, and more particularly, to the rear case 102. The camera 121 has a photographing direction that is substantially opposite to that of the former camera 121 shown in FIG. 21A and may have pixels differing from those of the firmer camera 121.

Preferably, for instance, the former camera 121 has low pixels enough to capture and transmit a picture of user's face for a video call, while the latter camera 121' has high pixels for capturing a general subject for photography without transmitting the captured subject. And, each of the cameras 121 and 121' can be installed at the terminal body to be rotated or popped up.

A flash 123 and a mirror 124 are additionally provided adjacent to the camera 121'. The flash 123 projects light toward a subject in case of photographing the subject using the camera 121'. In case that a user attempts to take a picture of the user (self-photography) using the camera 121', the mirror 124 enables the user to view user's face reflected by the mirror 124.

An additional audio output unit 152' can be provided to the backside of the terminal body. The additional audio output unit 152' is able to implement a stereo function together with the former audio output unit 152 shown in FIG. 2 and may be used for implementation of a speakerphone mode in talking over the terminal.

A broadcast signal receiving antenna 116 can be additionally provided to the lateral side of the terminal body as well as an antenna for communication or the like. The antenna 116 constructing a portion of the broadcast receiving module 111 shown in FIG. 1 can be retractably provided to the terminal body.

Figure 4:
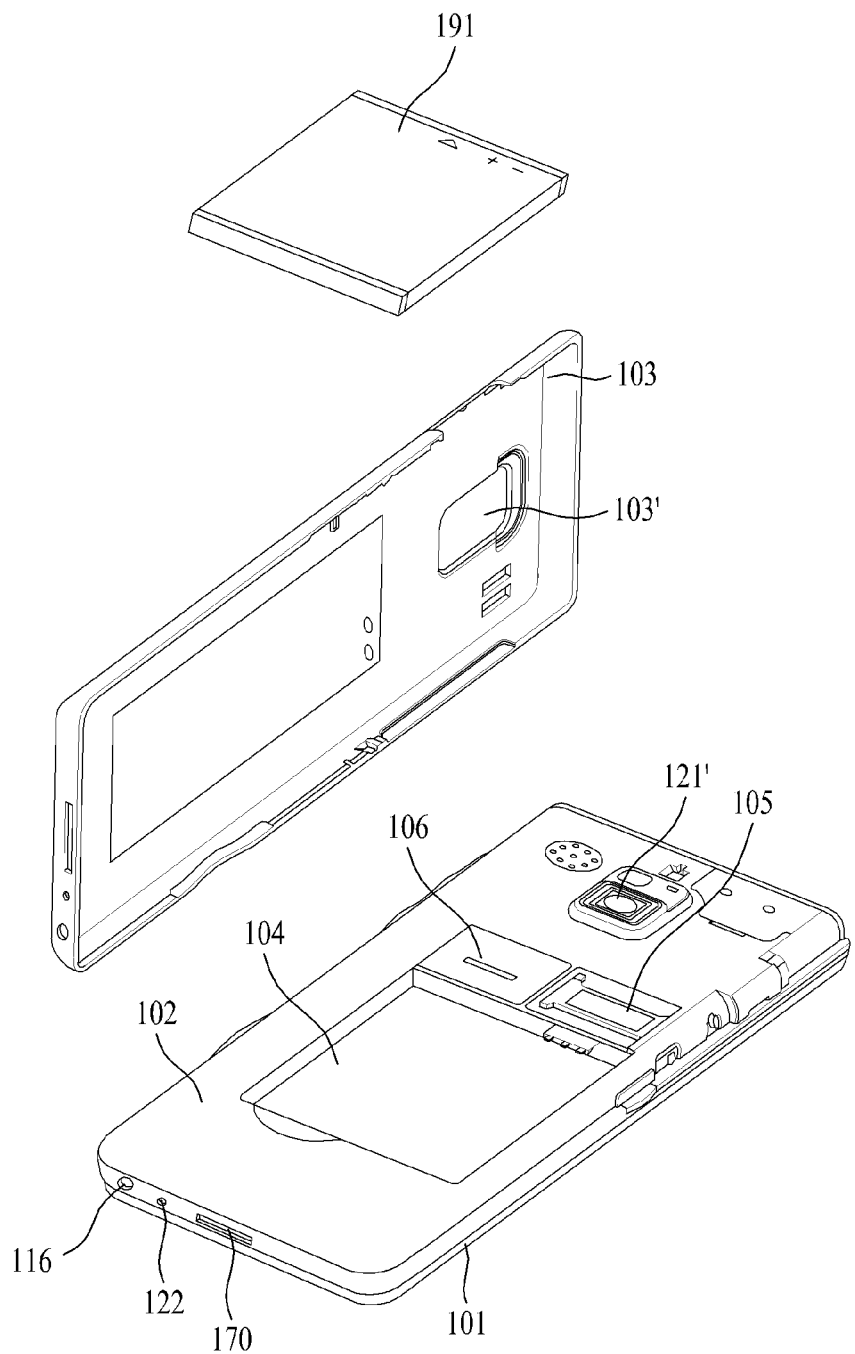
FIG. 4 is a rear perspective diagram of a surface of a rear case exposed by separating a rear cover of a mobile terminal according to one embodiment of the present invention.

FIG. 4 is a rear perspective diagram of a surface of a rear case exposed by separating a rear cover of a mobile terminal according to one embodiment of the present invention.

Referring to FIG. 4, a front case 101, a rear case 102, a rear cover (or a battery cover) 103, a camera 121', an interface unit 170, a microphone 122, a speaker module 154, an audio output unit 152', a battery 191, a battery loading unit 104, a USIM card loading unit 166, and a memory card loading unit 167 are provided.

A space for mounting such an external part as the battery loading unit 104, the USIM card loading unit 105, the memory card loading unit 106 and the like can be provided to a surface of the rear case 102. Generally, the external part loaded on the surface of the rear case 102 is provided to extend functions of the mobile terminal 100 in order to meet the diversified functions of the mobile terminal and a variety of the consumer's needs.

As the performance of the mobile terminal gets diverse, the battery 191 can be configured as a replaceable type, as shown in FIG. 4, to complement a considerable amount of power consumption. In case that the replaceable type is adopted, the battery loading unit 104 is formed on the surface of the rear case 102 to enable a user to detach the corresponding battery. In this case, a contact terminal is provided to the battery loading unit 104 to be electrically connected to a part installed within the case.

The USIM card loading unit 166 or the memory card loading unit 167 may be provided, as shown in FIG. 4, next to the battery loading unit 104. Alternatively, the USIM card loading unit 166 or the memory card loading unit 167 may be provided to a bottom surface of the battery loading unit 104. Hence, the battery 191 can be externally exposed if the battery 191 is unloaded from the battery loading unit 104. In this case, since a size of the battery loading unit 104 is extensible, the battery 191 can be oversized.

Although FIG. 4 shows the configuration that the USIM card loading unit 166 or the memory card loading unit 167 is mounted on a backside of the rear case 102, it can be inserted in or separated from the mobile terminal 100 in a manner of being inserted in a lateral side of the rear case 102.

The rear cover 103 covers the surface of the rear case 102. Hence, the rear cover 103 can fix the battery, 191, the USIM card, the memory card and the lime not to be separated from the rear case 102 and also protects the external parts from external shocks or particles. Recently, a waterproof function is added to the mobile terminal 100. In order to prevent the external parts from contacting with water, the mobile terminal 100 can further include a waterproof structure. Hence, when rear case 102 and the rear cover 103 are connected to each other, the waterproof structure can seal up the gap between the rear case 102 and the rear cover 103.

Figure 5:
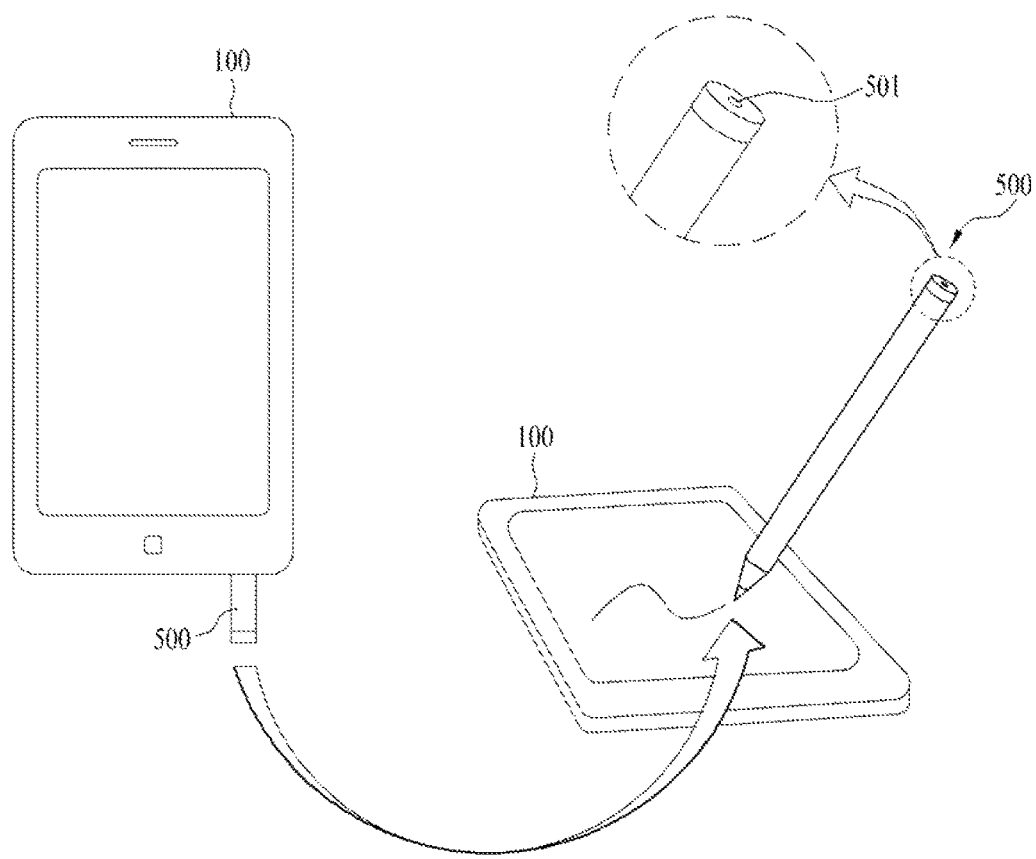
FIG. 5 is a diagram for an example of a pointing device according to one embodiment of the present invention.

FIG. 5 is a diagram for an example of a pointing device according to one embodiment of the present invention.

A means for controlling the mobile terminal 100 may include a finger and a pointing device. When a prescribed touch gesture is inputted on a touch screen 151 using the aforementioned means, the mobile terminal 100 can perform an operation corresponding to the inputted touch gesture.

Although the finger corresponds to the input means capable of inputting an input at any time, and anywhere, it may be difficult for the finger to input a detailed touch input.

The pointing device corresponds to an input assistance means to make up for the weal point of the finger. The pointing device may include a stylus pen as a representative example of the pointing device. As depicted in FIG. 5, the stylus pen 500 can be installed in the mobile terminal 100 in a form of attaching/detaching to/from the mobile terminal 100.

The stylus pen 500 indicates a pen used for marking such as writing, drawing, and the like on a computer screen (e.g., a touch screen or a drawing pad). Since the stylus pen 500 can input an input via one end of the stylus pen while holding the stylus pen 500 like a pencil does, the stylus pen can perform more detailed touch input compared to the finger. Moreover, since various modules can be installed in the stylus pen 500, the stylus pen not only simply assists the touch input but also assists various functions of the mobile terminal 100.

The stylus pen 500 according to one embodiment the present invention can be equipped with a microphone. As depicted in FIG. 5, the microphone can be installed in one end (an opposite end of a nib) 501 of the stylus pen 500.

Embodiments of the present invention intend to provide efficient controlling methods capable of expanding the aforementioned functions.

Figure 6:
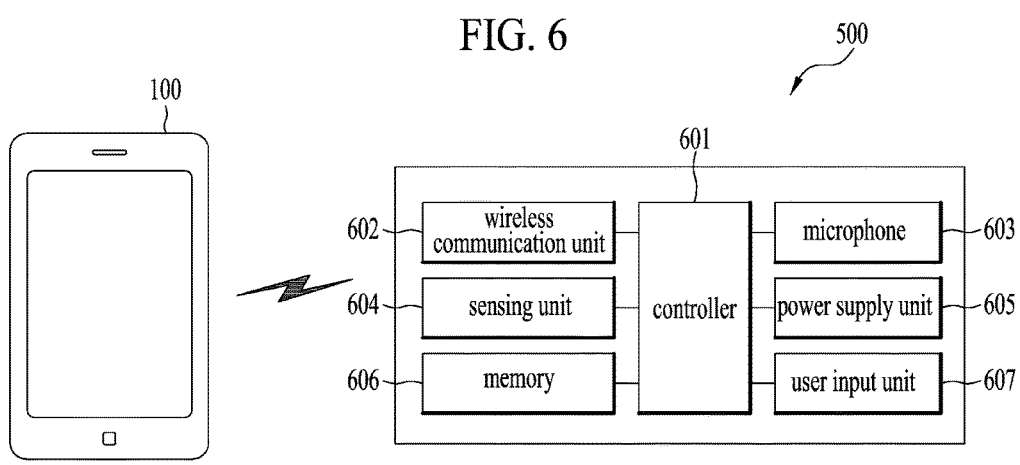
FIG. 6 is a block diagram for a stylus pen 500 according to one embodiment of the present invention.

FIG. 6 is a block diagram for a stylus pen 500 according to one embodiment of the present invention.

Referring to FIG. 6, the stylus pen 500 can include at least one selected from the group consisting of an s-controller 601, an s-wireless communication unit 602, an s-microphone 603, an s-sensing unit 604, an s-power supply unit 605, an s-memory 606 and an s-user input unit 607. The mobile terminal 100 and the stylus pen 500 according to embodiment of the present invention include configuration of an identical name in terms of names of an internal configuration. Hence, in explaining embodiments of the present invention, 's-' is attached to the front of the name of configuration of the stylus pen 500 to easily identify the identical configuration name.

The s-controller 601 can control overall operation of the stylus pen 500 according to one embodiment of the present invention. For instance, the s-controller 601 stores audio data received from the s-microphone 603 in the s-memory 606 or can control the audio data received from the s-microphone 603 to be transmitted to an external device via the s-wireless communication unit 602.

The s-wireless communication unit 602 can transceive data with an external device using a wireless communication technology. In particular, the s-wireless communication unit 602 can be installed to transceive data with the mobile terminal 100 in one embodiment of the present invention. In order to transceive data with the mobile terminal 100, short-range communication technologies can be used. Examples of the short-range communication technologies may include Bluetooth, infra-red communication, ZigBee and WiFi. Meanwhile, if a technology is not limited by the short-range communication technology of the embodiment of the present invention and is capable of transceiving data between the mobile terminal 100 and the stylus pen 500, the technology can be applied to one embodiment of the present invention.

The s-microphone 603 receives an external sound signal via a microphone in a phone call mode/recording mode, a voice recognition mode and the like and converts it to an electric audio data. The audio data is transmitted to an external device (e.g., mobile terminal) via the s-wireless communication unit 602 or can be stored in the s-memory 606.

The s-sensing unit 604 generates a sensing signal in a manner of detecting such a current state of the stylus pen 500 as a position of the stylus pen 500, acceleration/deceleration of the stylus pen 500, detection of a hand writing memo written by using the stylus pen 500, and the like. In particular, the s-sensing unit 604 according to one embodiment of the present invention is installed in one end of the stylus pen 500 and may be then able to detect a hand writing memo written by using the stylus pen 500. The detection of the hand writing memo can be performed by a tracking sensor. The tracking sensor is a sensor configured to detect a relative position change with a face on which a virtual hand writing memo is written. Examples of the tracking sensor may include an optical sensor or a ball sensor. In particular, the hand writing memo via the stylus pen 500 can be detected by the tracking sensor which is installed in one end of the stylus pen 500 in a manner of detecting the relative position change with the face on which the virtual hand writing memo is written and analyzing a path of the detected position change. The detected hand writing memo can be stored in the s-memory 606 or can be transmitted to an external device (e.g., mobile terminal) via the s-wireless communication unit 602.

The s-power supply unit 605 supplies power to each component of the stylus pen 500. In case that the s-power supply unit 605 is attached to the mobile terminal 100, the s-power supply unit is electronically connected with the mobile terminal 100 and may charge the mobile terminal in a manner of being supplied power via the electronic connection.

The s-memory 606 can store various data. As mentioned in the foregoing description, the s-memory can store audio data converted via the s-microphone 603, a hand writing memo data detected by the sensing unit, and the like.

The s-user input unit 607 is installed to receive a specific command from a user. Example of the s-user input unit may include a recording button (not depicted) to start/end recording.

In the following description, various controlling methods capable of assisting an intuitive input of a user by using the aforementioned stylus pen 500 are explained with reference to the attached drawings.

Figure 7:
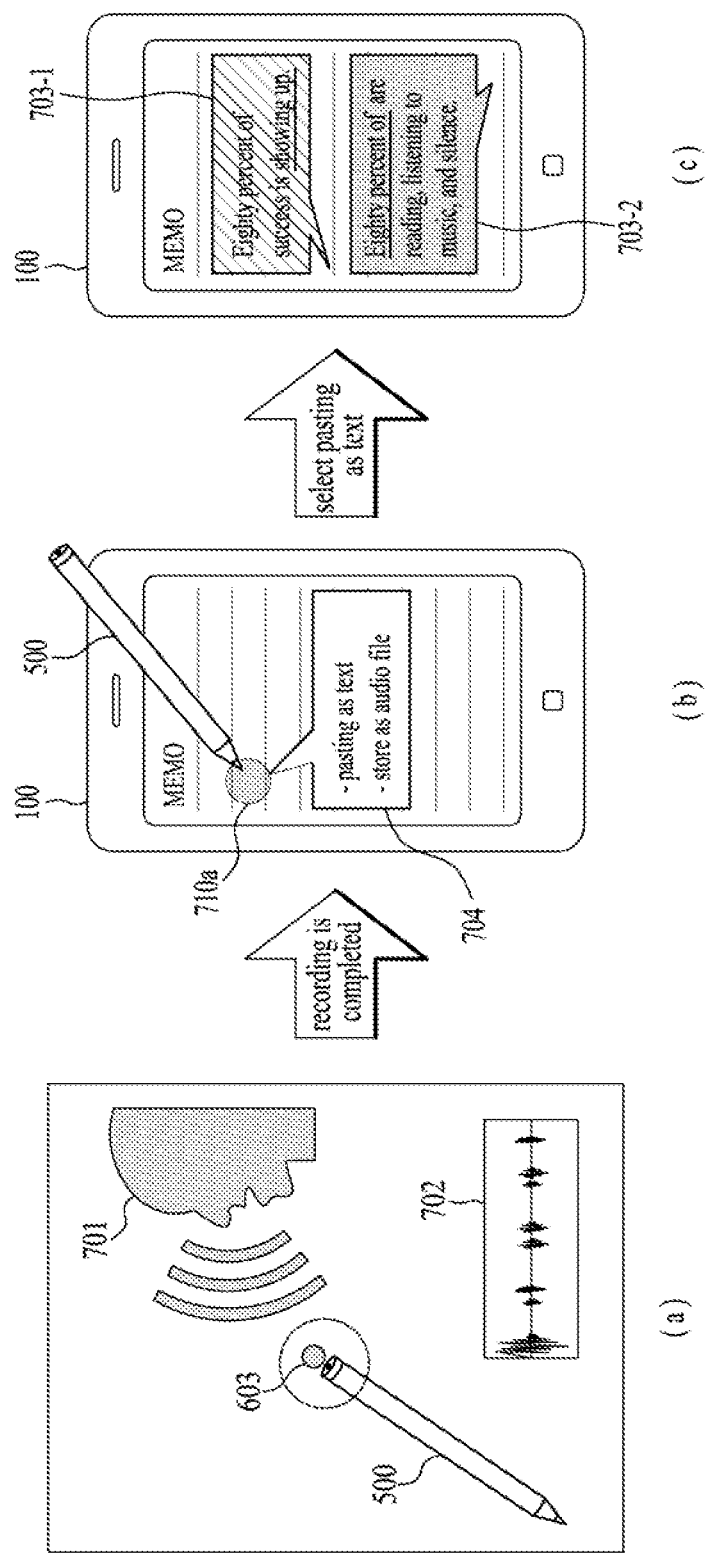
FIG. 7 is a diagram for a method of pasting a voice memo received via a stylus pen 500 to a mobile terminal 100 in a text form according to one embodiment of the present invention.

FIG. 7 is a diagram for a method of pasting a voice memo received via a stylus pen 500 to a mobile terminal 100 in a text form according to one embodiment of the present invention.

As depicted in FIG. 7 (*a*), a method of controlling the stylus pen according to one embodiment of the present invention is to receive a voice signal 702 of a user 701 via the s-microphone 603 of the stylus pen 500.

The stylus pen 500 itself may have a relatively smaller volume and a lighter weight compared to the mobile terminal 100. Hence, it may be more convenience to use the s-microphone 603 of the stylus pen which is relatively lighter compared to a microphone 122 of the mobile terminal 100. This is because as a distance between a position of a microphone and a voice signal 702 is closer, an impact from surrounding noise can be minimized. In particular, in case of using the s-microphone 603 of the stylus pen 500, it may be easy to move the s-microphone to near a mouth of a user 701 intending to record a voice recording. Moreover, when a user intends to input a voice recording while watching a specific image or a video via a touch screen 151 of the mobile terminal 100, the utility of an input of a voice memo, which is inputted via the s-microphone 603 of the stylus pen 500, may increase.

Above all, in case of utilizing a plurality of microphones, information on a directional property of the voice signal 702 can be secured. Hence, according to one embodiment of the present invention, the voice signal 702 is received via the s-microphone 603 of the stylus pen 500. And, the stylus pen 500 can deliver the received voice signal 702 to the mobile terminal 100.

According to one embodiment of the present invention, in storing the voice signal 702 received via the stylus pen 500, the present invention proposes that a form in which the voice signal 702 is stored and/or a position (type of application) in which the voice signal 702 is stored is determined by a prescribed input which is inputted via the stylus pen 500.

According to one embodiment of the present invention, the controller 180 can distinguish a generally inputted touch input from a touch input inputted via the stylus pen 500 in a manner of differentiating touch means touching a touch screen 151 from each other. In order to differentiating the touch inputs, which are inputted by touch means different from each other, 'pen-' is attached to the front of the touch input inputted via the stylus pen 500 in one embodiment of the present invention described in the following (e.g., pen-touch, pen-touch drag, etc.).

As depicted in FIG. 7 (*b*), if a pen-touch input 710*a* is received while a prescribed application is executing, the controller 180 can perform an operation of pasting a recoded voice signal 702 via the stylus pen 500 in response to the pen-touch input.

In performing the aforementioned pasting operation, the controller 180 selects a pasting mode and proposes to vary a pasting form in accordance with the selected mode.

A pasting as text mode is a mode for converting the recorded voice signal 702 to a text and then pasting the converted text (it shall be described with reference to FIG. 7 and FIG. 8).

An audio data pasting mode is a mode for storing the recoded voice signal 702 as it is and then pasting a playback icon configured to play the stored audio data (it shall be described with reference to FIG. 9 and FIG. 10).

In case of selecting a pasting mode, the controller 180 outputs a pasting selection pop-up window 704 capable of receiving a selection input from a user and may receive an input for selecting the pasting mode from the user via the pasting selection pop-up window 704.

Assume that the 'pasting as text' mode is selected from the pasting selection pop-up window 704 depicted in FIG. 7 (*b*). The controller 180 converts the recorded voice signal 702 to a text and may be then able to paste the converted text.

Meanwhile, when the converted text is pasted, it is necessary to determine an application in which the pasting operation to be performed and a position on which the pasting operation is performed. According to one embodiment of the present invention, if the pen-touch input 710*a* is inputted on a prescribed position while a prescribed application is executing, the present invention proposes that the pasting operation to be performed on the prescribed position of the prescribed application. Hence, the controller 180 can determine the prescribed application and the prescribed position on which the pen-touch input 710*a* is inputted and can paste the converted text to the determined prescribed position of the prescribed application (it may identically apply to the audio data pasting mode). Hence, as depicted in FIG. 7 (*b*), the pasting operation can be performed on the prescribed position (the position on which the 710*a* input is inputted) while a memo application is executing.

Meanwhile, assume that voices of a plurality of persons are recorded in the recorded voice signal 702. In case of outputting the converted text, the controller 180 according to one embodiment of the present invention can output the converted text in accordance with a person. For instance, as depicted in FIG. 7 (*c*), the controller 180 can display a text from which a voice of a first person is converted as a first color text balloon 703-1 and can display a text from which a voice of a second person is converted as a second color text balloon 703-2.

Meanwhile, in case of converting a voice to a text, there may exist a case that the voice is not properly converted due to surrounding noise, an unclear pronunciation, or the like. Hence, one embodiment of the present invention intends to provide a user interface capable of easily modifying a converted text, which is converted by performing a pasting operation in the pasting as text mode.

Figure 8:
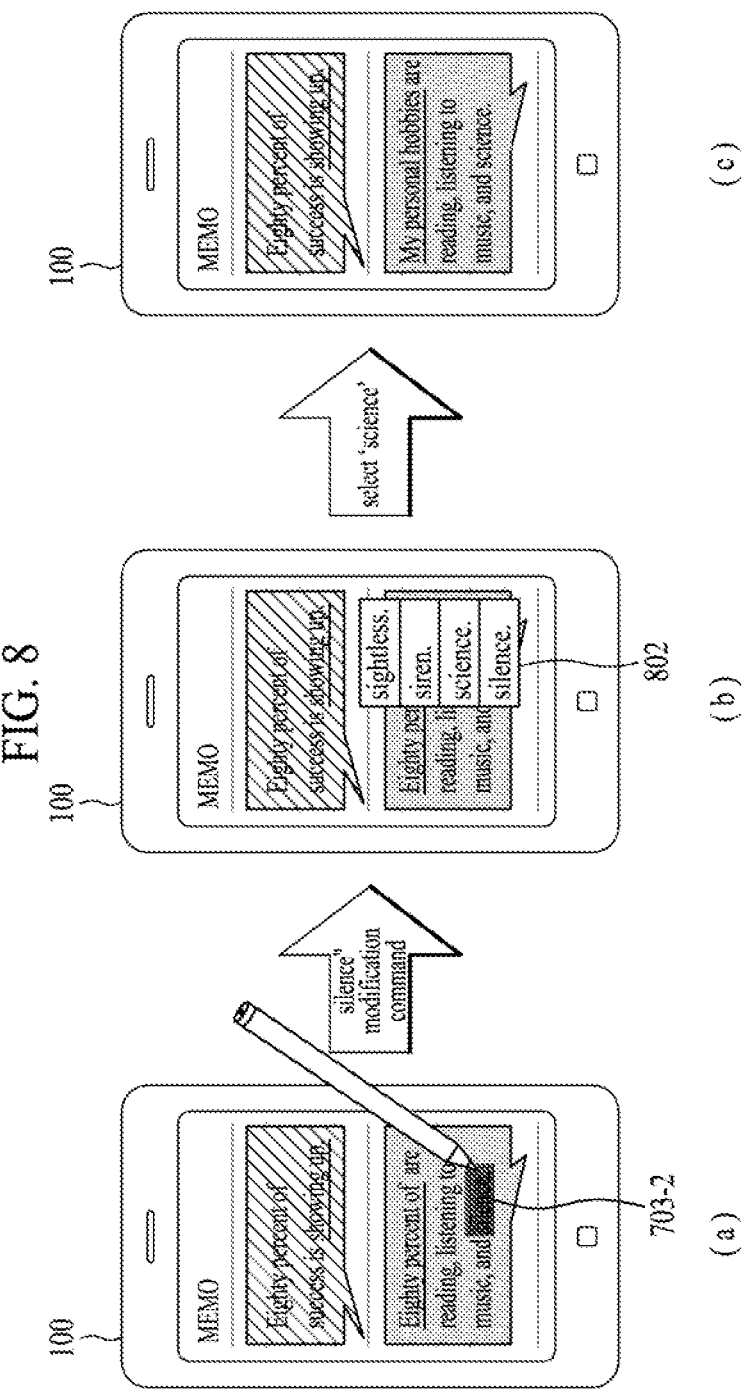
FIG. 8 is a diagram for a method of modifying a text after a text pasting operation is performed according to one embodiment of the present invention.

FIG. 8 is a diagram for a method of modifying a text after a text pasting operation is performed according to one embodiment of the present invention.

Referring to FIG. 8 (*a*), similar to FIG. 7 (*c*), a pasting for a voice signal 702 of a user is performed in a text form. Referring to a second text balloon 703-2, the text balloon includes such a word as 'silence'. Assume that the word is not properly converted in a process of converting to a text. For instance, although a corresponding voice means 'science', the voice is wrongly converted to a text 'silence' in the process of converting.

If a pasting of the converted text is performed and a prescribed touch input, which is inputted on the pasted text, is received, the controller 180 enables a user to modify the text. If the controller 180 receives a pen-touch input inputted on 'silence', the controller 180 can output a modifiable candidate word list pop-up window 802 as depicted in FIG. 8 (*b*). The candidate word list pop-up window 820 can include candidate words very similar to a corresponding voice including a currently displayed word 'silence'. It may display the currently selected word 'silence' to be identified in the candidate word list pop-up window 802.

If a prescribed candidate word is selected from the candidate word list pop-up window 802, the controller 180 can perform a text modification operation by the selected text. For instance, as depicted in FIG. 8 (*b*), if a candidate word 'science' is selected, the controller 180 can modify the text in the second text balloon 703-2 with the 'science'.

Moreover, the controller 180 not only select a prescribed candidate word from a list of candidate words but also receive a typing input and modify a word according to the received typing input.

Figure 9:
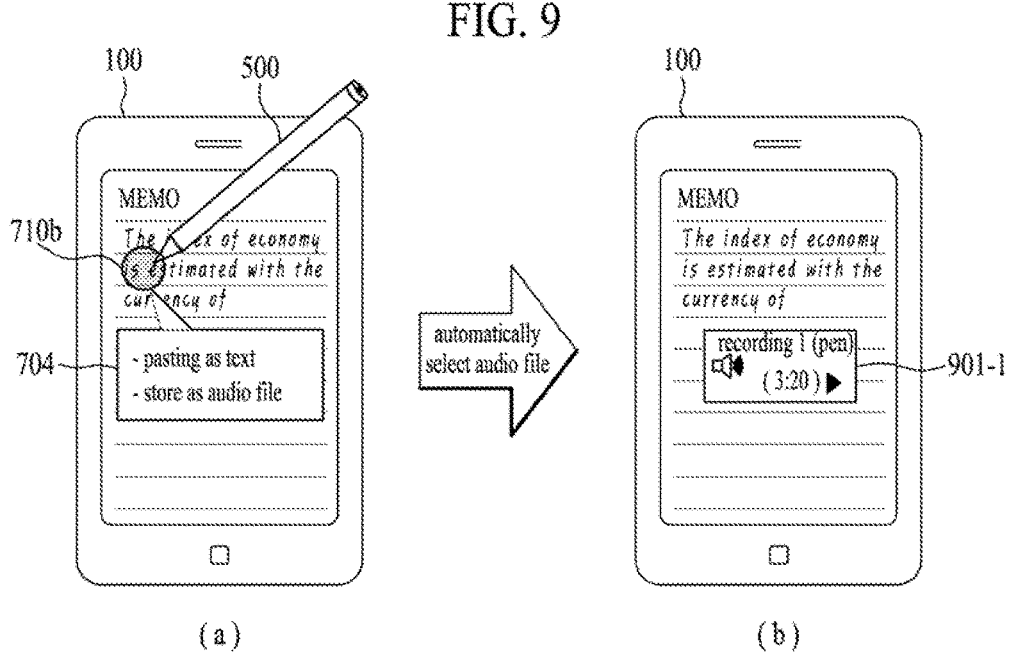
FIG. 9 is a diagram for a method of pasting a voice memo received via a stylus pen 500 to a mobile terminal 100 in an audio data form according to one embodiment of the present invention.

FIG. 9 is a diagram for a method of pasting a voice memo received via a stylus pen 500 to a mobile terminal 100 in an audio data form according to one embodiment of the present invention.

As mentioned earlier in FIG. 7, in FIG. 9, assume that a pasting selection pop-up window 704 is outputted and 'storing as audio file' is selected. When a pasting for a voice signal 702 is performed, the controller 180 may operate in an audio data pasting mode. In particular, a playback icon 901-1 can be pasted to play the voice signal 702.

As depicted in FIG. 9 (*b*), the playback icon 901-1 can indicate play time of the voice signal 702. And, the playback icon can indicate that the voice signal received from the stylus pen 500. If an input for selecting the playback icon 901-1 is received, the controller 180 can play the voice signal 702.

FIG. 10 is a diagram for examples of a playback icon according to one embodiment of the present invention. The playback icons depicted in FIG. 10 are just examples, by which embodiments of the present invention may be non-limited.

FIG. 10 (a) shows the playback icon 901-1 depicted in FIG. 9 (b). A form of the playback icon during playback and a form of the playback icon when the playback is stopped may be different from each other. In the same manner, in FIG. 10 (b) and (c), a form of the playback icon during playback and a form of the playback icon when the playback is stopped may be different from each other.

In particular, the playback icon depicted in FIG. 10 includes play time of a recorded voice signal 702 and a button for playing the recorded voice signal.

Meanwhile, according to the foregoing description described with reference to FIG. 7 to FIG. 9, the voice signal 702 has been explained in an assumption that the voice signal is a contiguous voice signal. One embodiment of the present invention proposes that a pasting operation is performed not only for a single voice signal data but also for a plurality of voice signal data. Regarding this, it is explained with reference to FIG. 11.

Figure 11:
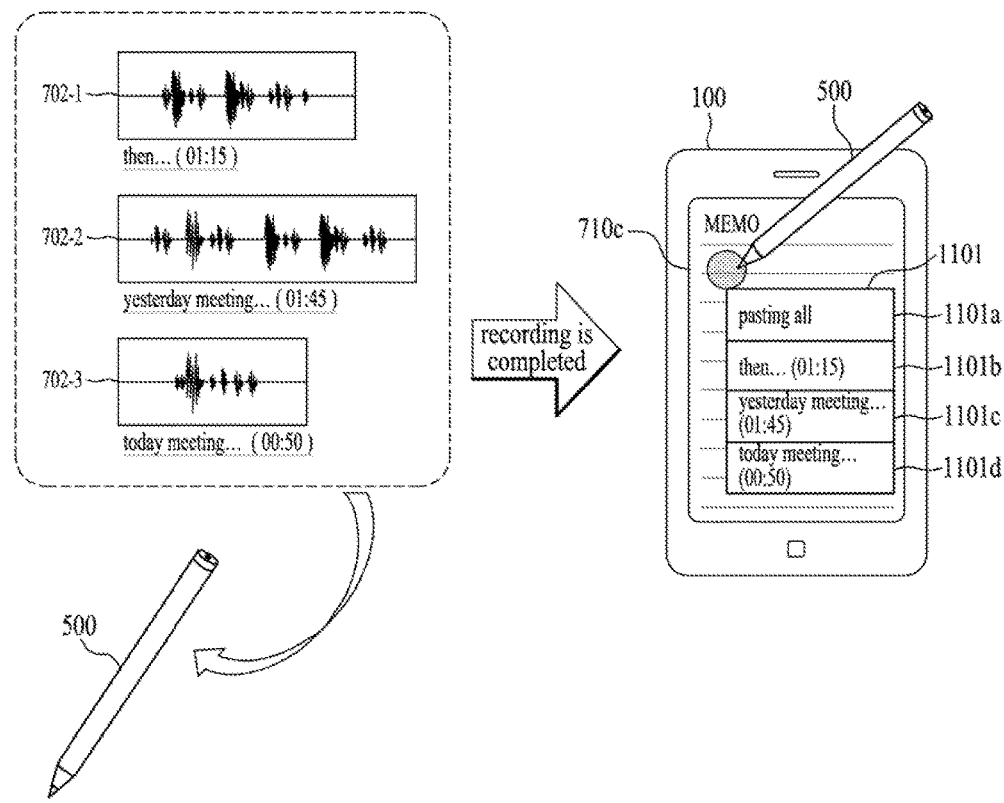
FIG. 11 is a diagram for a method of pasting a voice memo to a mobile terminal 100 according to one embodiment of the present invention when the voice memo received via a stylus pen 500 includes a plurality of voice signal data.

FIG. 11 is a diagram for a method of pasting a voice memo to a mobile terminal 100 according to one embodiment of the present invention when the voice memo received via a stylus pen 500 includes a plurality of voice signal data.

Referring to FIG. 11, assume that a first voice signal 702-1 to a third voice signal 702-3 are received via the stylus pen 500. The stylus pen 500 can store the received first to third voice signal 702-1 to 702-3 in the s-memory 606.

A plurality of voice signal data can be generated by performing a recording operation several times by a user. Or, a plurality of the voice signal data can also be generated by continuity of a voice signal in the middle of a series of recording processes. In particular, the controller 180 automatically deletes a part of sections where a voice signal does not exist in the middle of recording a voice memo and generates a plurality of the voice signal data in a manner of automatically sorting sections where the voice signal exist only.

If a pasting command for a plurality of the voice signal data is received, the controller 180 can output a pop-up window for asking which one among a plurality of the voice signal data to be pasted.

In particular, as depicted in an example of FIG. 11, when the first to the third voice signal 702-1 to 702-3 are recorded via the stylus pen 500, if a pasting command 710c (pen-touch input) is received, the controller 180 can output a pop-up window 1101 for selecting a pasting target. In particular, a user can select whether a pasting for all voice signals is performed or a pasting for one of the first to the third voice signal is performed via the pop-up window 1101.

For instance, if an item 1101b is selected on the pop-up window 1101, a pasting operation can be performed for the first voice signal 702-1 only. A pasting operation for a different item can performed in a same way.

Meanwhile, one embodiment of the present invention further proposes a method of displaying a recommended item in the pop-up window 1101 for selecting one of a plurality of the voice signal data. Regarding this, it shall be explained with reference to FIG. 12 in the following.

Figure 12:
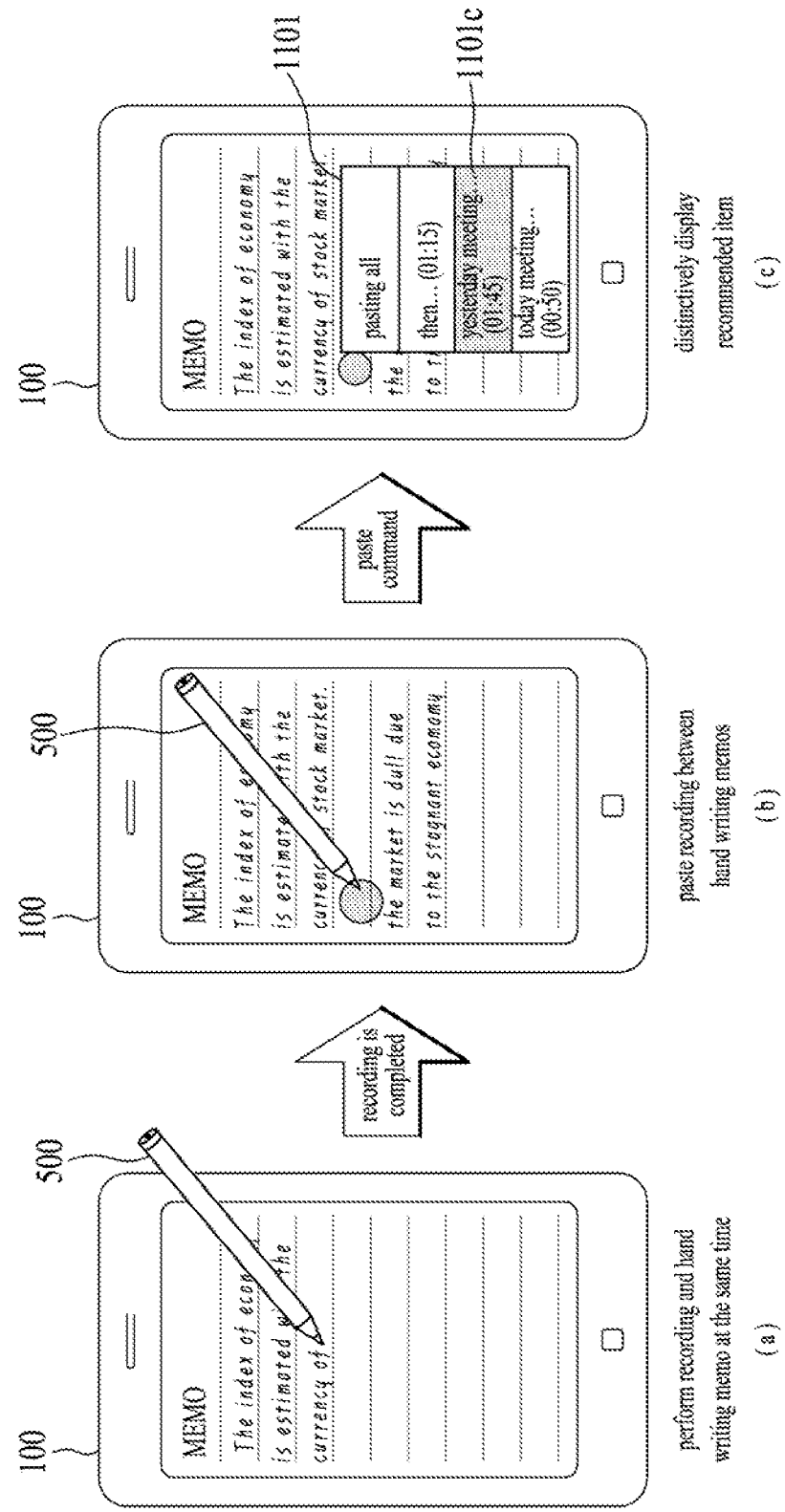
FIG. 12 is a diagram for an example of a method of displaying a recommended item in case of performing an operation of pasting a voice memo to a mobile terminal 100 when the voice memo received via a stylus pen 500 includes a plurality of voice signal data.

FIG. 12 is a diagram for an example of a method of displaying a recommended item in case of performing an operation of pasting a voice memo to a mobile terminal 100 when the voice memo received via a stylus pen 500 includes a plurality of voice signal data.

FIG. 12 (a) shows a situation that a recording operation and a hand writing memo are performed at the same time. In particular, assume that a user writes a handwriting memo in a touch screen 151 of the mobile terminal 100 using the stylus pen 500 and stores a voice memo using the s-microphone 603 of the stylus pen 500. And, as mentioned earlier in FIG. 11, assume that the stored voice memo includes a plurality of voice signal data.

FIG. 12 (b) shows a state that a pasting operation for a recorded voice memo is performed in a prescribed position about halfway of the handwriting memo when a recording is completed. One embodiment of the present invention proposes a voice signal data, which is stored on a time identical to a time on which a hand writing memo is written in a prescribed position, to be displayed in the pop-up window among a plurality of the voice signal data. In particular, an item, which is matched with the time on which the memo is written, is recommended among the first to the third voice signal 702-1 to 702-3.

Hence, the controller 180 detects a prescribed position in which a pasting command is inputted in the hand writing memo and may be then able to recommend a voice signal which is recorded in a closest time of inputting the handwriting memo in the detected prescribed position. And, the controller 180 can display the recommended voice signal item 1101c in the pop-up window 1101 as shown in FIG. 12 (c).

In case of inputting a voice memo and a hand writing memo (or typing memo) at the same time, a method of enhancing convenience is explained in detail with reference to FIG. 13 and FIG. 14 in the following description.

Figure 13:
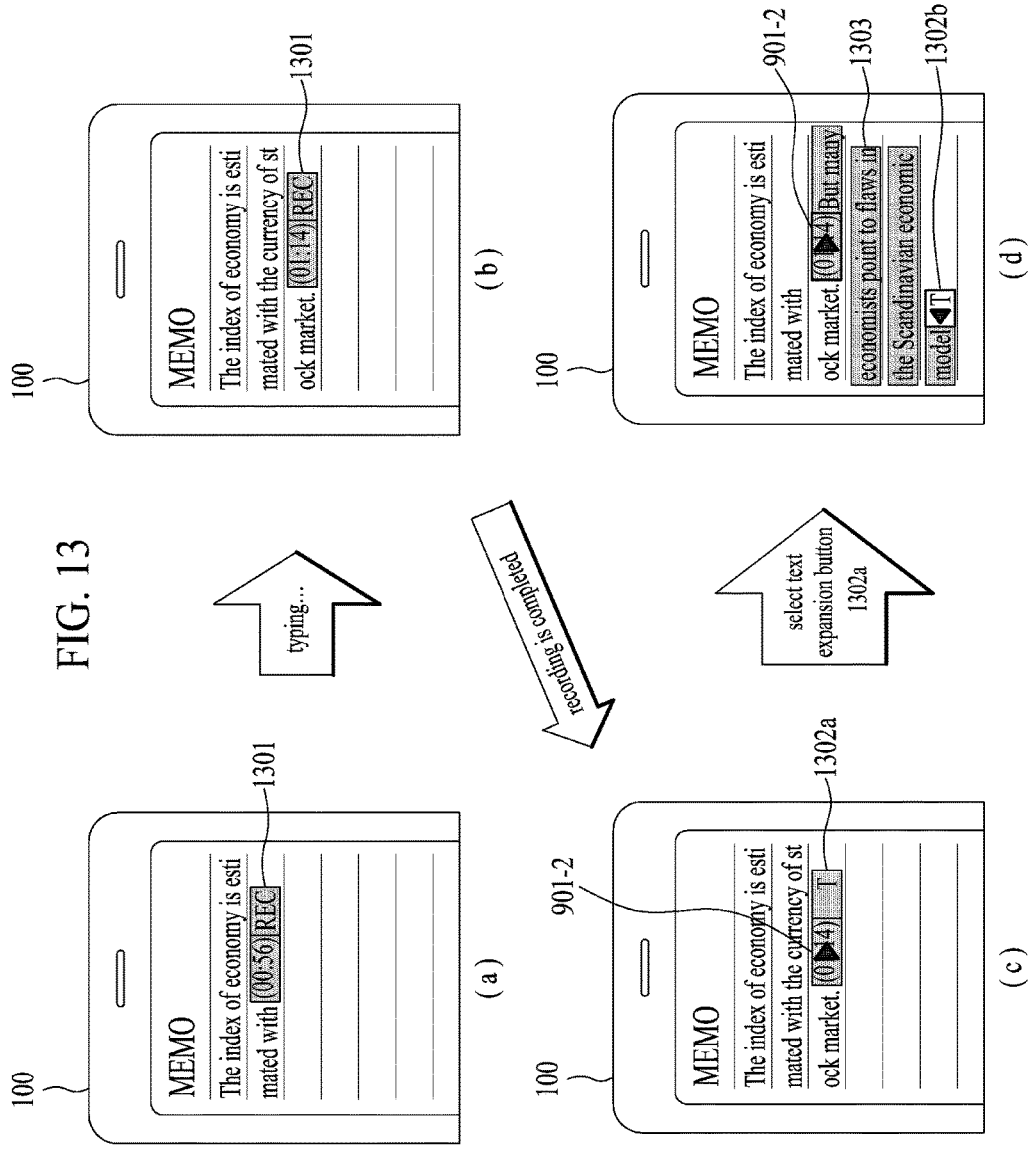
FIG. 13 is a diagram for a method of inputting a voice memo together with a typing memo according to one embodiment of the present invention.

FIG. 13 is a diagram for a method of inputting a voice memo together with a typing memo according to one embodiment of the present invention.

Referring to FIG. 13 (a), assume that the mobile terminal 100 receives an input of a typing memo from a user and receives an input of a voice memo via the s-microphone 603 of the stylus pen 500 as well. The controller 180 can output a recording indicator 1301 indicating that a voice memo is recording.

As depicted in FIG. 13 (a), the recording indicator 1301 can display a time of recording currently progressing and can be displayed in a position of a cursor where a typing memo is performed. In particular, as depicted in FIG. 13 (b), since the position of the cursor moves according to the typing memo, a position of the recording indicator 1301 may move as the recording and the typing memo are progressed.

FIG. 13 (c) shows a state that the recording is completed. The recording indicator 1301 can change to a playback icon 901-2 after the recording is completed.

When the recording is completed, one embodiment of the present invention proposes to output a text expansion icon 1302a for a recorded voice memo. The text expansion icon 1302a is an icon for outputting the recorded voice memo in a text form. If the text expansion icon 1302a is selected, the controller 180 can output 1303 the recorded voice memo in the text form (refer to FIG. 13 (d)). In addition, the controller 180 can output a text reduction icon 1302b for making the text disappear again together with the output of the voice memo in the text form. In particular, a user unfolds the voice memo in the text form using the text expansion icon 1302a and folds the expanded texts using the text reduction icon 1302b again.

Irrespective of the text expansion and the text reduction, if the playback icon 901-2 is selected, the recorded voice memo can be played as mentioned in the foregoing description.

Figure 14:
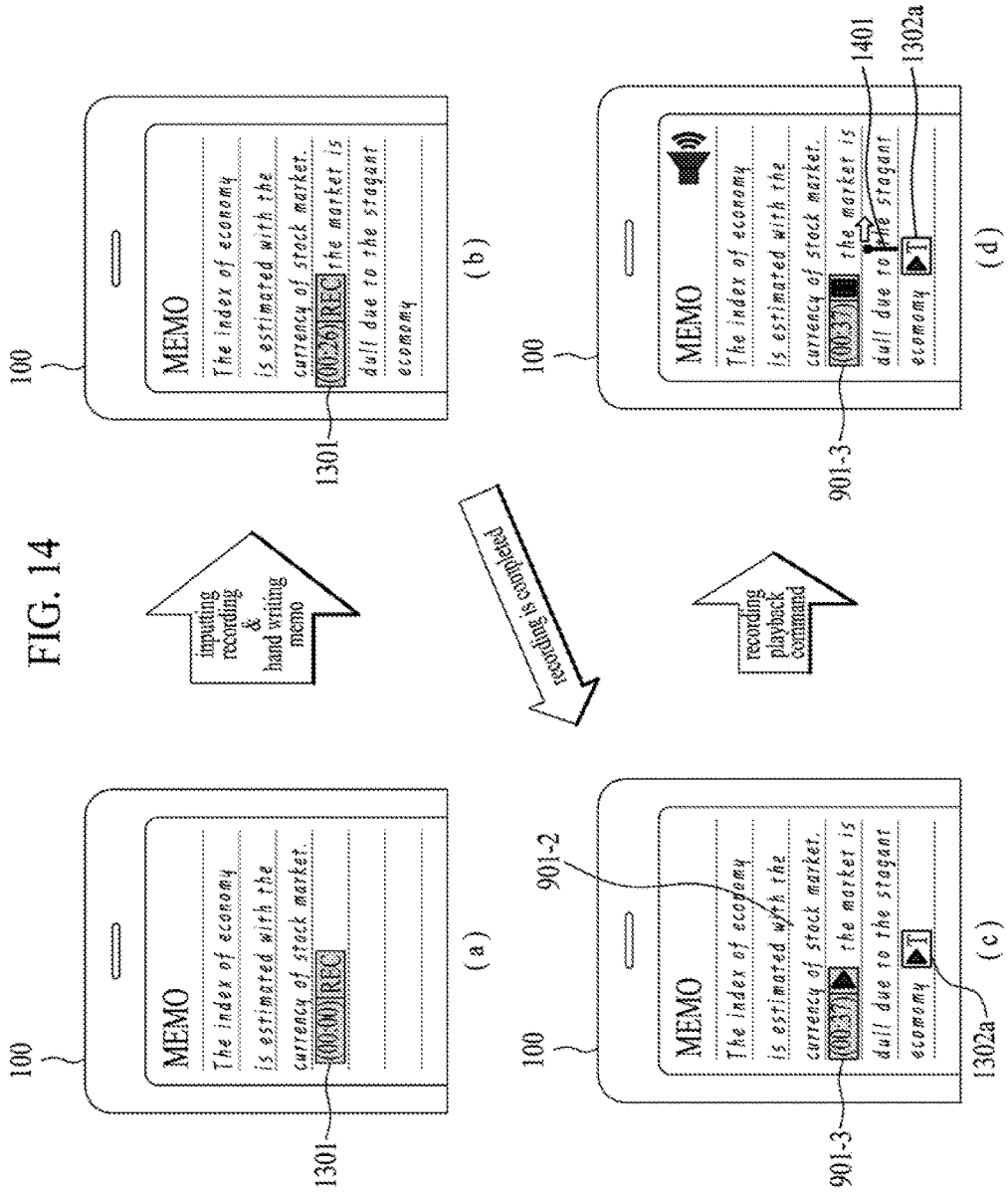
FIG. 14 is a diagram for a method of inputting a voice memo together with a hand writing memo according to one embodiment of the present invention.

FIG. 14 is a diagram for a method of inputting a voice memo together with a hand writing memo according to one embodiment of the present invention.

Referring to FIG. 14 (a), FIG. 14 (a) shows a state of a memo application and the state indicates that a part of a hand writing memo is already inputted. In this case, if a command for initiating a recording is inputted in the state that the hand writing memo is inputted, the stylus pen 500 can output the recording indicator 1301 while initiating the recording at the same time. Since the recording indicator 1301 is mentioned earlier with reference to FIG. 13, detailed explanation on the recording indicator is omitted at this time.

FIG. 14 (b) shows a state that a hand writing memo is additionally inputted. As the hand writing memo and the recording are simultaneously performed, it is able to check that a time of performing the recording is increasing in the recording indicator 1301.

FIG. 14 (c) shows a state that the hand writing and the recording are completed. When the recording is completed, the controller 180 can output a playback icon 901-3 instead of the recording indicator 1301 in a manner of changing with each other. According to one embodiment of the present invention, if the recording is completed, the controller 180 can output the text expansion icon 1302a. As depicted in FIG. 14 (c), the controller can output the text expansion icon 1302a at the very end of the hand writing memo. In particular, the controller 180 can output the text expansion icon 1302a at a position in which the hand writing memo is completed on a moment that the recording is completed.

As mentioned earlier in FIG. 13, if the text expansion icon 1302a is selected, the controller 180 can output the recorded voice memo in the text form.

Meanwhile, if the playback icon 901-3 is selected, one embodiment of the present invention proposes to display a progressive indicator 1401 indicating the extent of playing the recorded voice while the recorded voice memo is playing at the same time. In particular, in displaying the progressive indicator 1401, the progressive indicator is displayed on the hand writing memo which is inputted together with the recording of the voice memo. One embodiment of the present invention proposes that the progressive indicator indicates the hand writing memo which is written on a time identical to a time of recording.

Referring to FIG. 14, such a hand writing memo as 'The market is dull due to the stagnant economy' is written together with a recording of a voice memo. Then, the controller 180 can display the progressive indicator 1401 in a position of the hand writing memo which is matched with a time of the recording. In particular, a user can check the hand writing memo which is written on the time of recording.

The utility of the stylus pen 500 according to one embodiment of the present invention can be maximized when the mobile terminal 100 performs a different job. As a representative example, the stylus pen 500 can be efficiently utilized while talking over the phone using the mobile terminal 100. Regarding this, it shall be described with reference to FIG. 15 and FIG. 16 in the following.

Figure 15B:
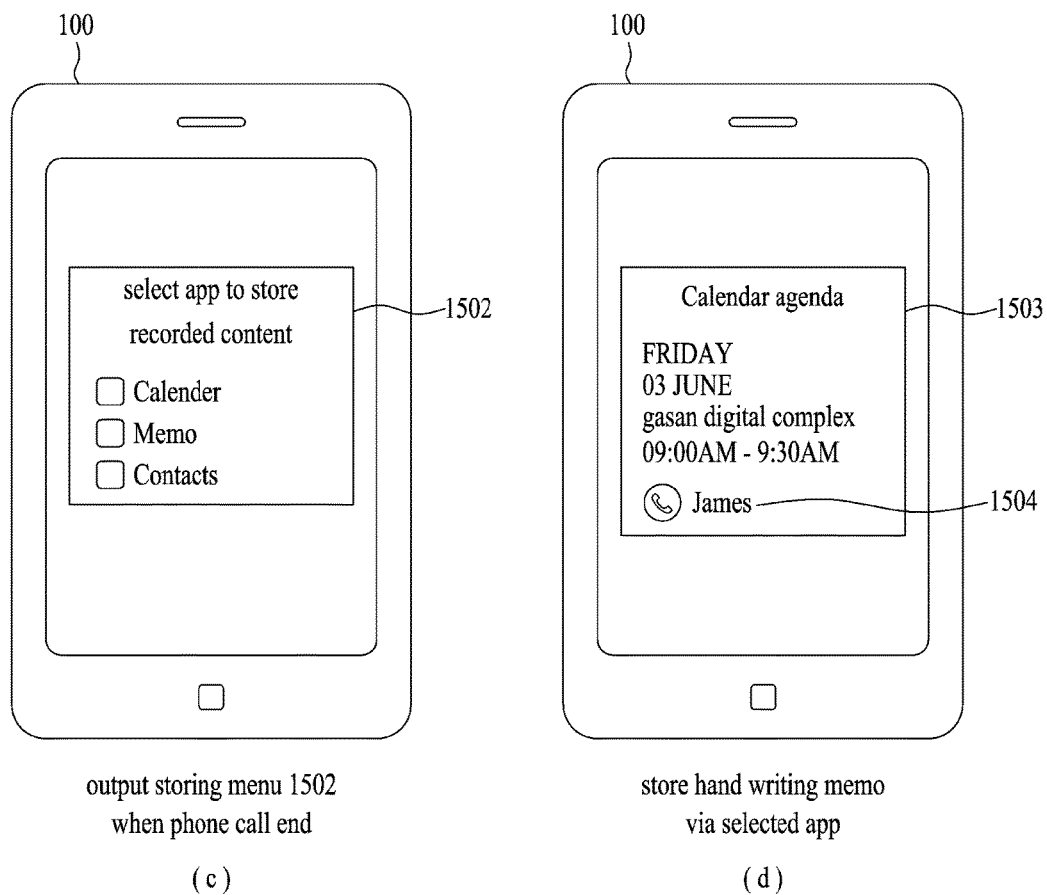

FIG. 15, including FIG. 15A and FIG. 15B, is a diagram for an example of a method of writing a memo using a stylus pen 500 while talking over the phone according to one embodiment of the present invention.

FIG. 15 (a) shows a situation that a user is inputting a hand writing memo on a virtual memo pad 1501 (e.g., floor, paper, and the like) using the stylus pen 500 while receiving a call signal using the mobile terminal 100. A nib of the stylus pen 500 according to one embodiment of the present invention includes a tracking sensor and can detect the hand writing memo of the user.

If the user needs to write a memo while talking over the phone, the user detaches the stylus pen 500 from the mobile terminal 100 and can input a virtual hand writing memo on the virtual memo pad 1501 (e.g., floor, paper and the like) using the stylus pen 500 (FIG. 15 (b)). The stylus pen 500 detects the virtual hand writing memo via the s-sensing unit 604 and can transmit the detected virtual hand writing memo to the mobile terminal 100 via the s-wireless communication unit 602.

Having received the virtual hand writing memo from the stylus pen 500 via the wireless communication unit 100, the controller 180 can store the virtual hand writing memo via a prescribed application (or a prescribed scheme). According to one embodiment of the present invention, in selecting the prescribed application, a selection pop-up window 1502 for receiving a selection of an application is outputted and a user can select an application to be used for storing the virtual hand writing memo from the selection pop-up window.

At least one application is selected from the selection pop-up window 1502 and the controller 180 can store the virtual hand writing memo using the selected at least one application.

According to one embodiment of the present invention, the controller 180 can recognize the virtual hand writing memo as a text and can store the hand writing memo in a text form. FIG. 15 (d) is a diagram for a reading screen of the memo which is stored in the text form. Assume that the memo is stored in a calendar application. Additionally, when the controller 180 reads the stored hand writing memo, the controller can further display a phone call icon 1504 capable of directly making a call to a person with which the user has made a call when the hand writing is stored. In particular, while reading the stored memo via the calendar application, the user can make a call to the person with which the user has made a call when the memo is inputted in a manner of selecting the phone call icon 1504. To this end, when the virtual hand writing memo is stored, the controller 180 may further store counterpart identification information on a counterpart with which the user has made a call when the memo is inputted. For instance, the counterpart identification information may include a name, a telephone number in the phone book.

Meanwhile, explanation in relation to FIG. 15 has explained that a selection from the user is inputted by outputting a pop-up window when an application (or a storing method) for storing the virtual hand writing memo is selected. Unlike the aforementioned method, a different embodiment of the present invention proposes to select an application according to a predetermined pattern which is inputted on a virtual hand writing memo. Regarding this embodiment, it shall be described with reference to FIG. 16 in the following.

Figure 16:
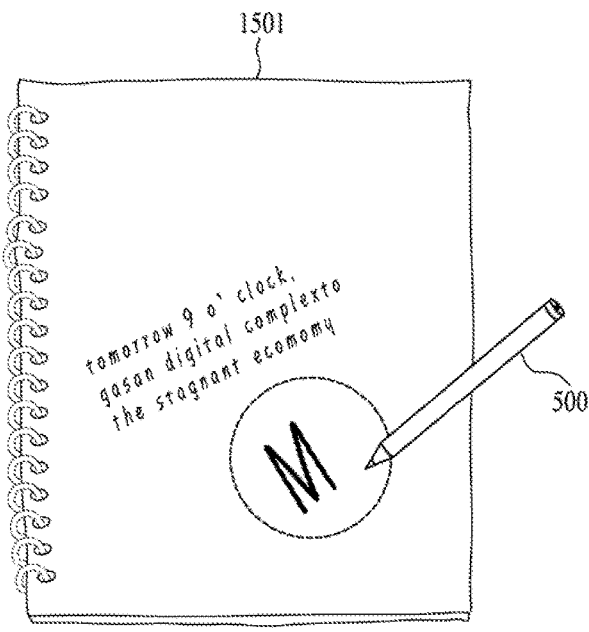
FIG. 16 is a diagram for an example of a method of selecting an application to be stored according to a prescribed drawing pattern on a virtual hand writing memo inputted via a stylus pen 500.

FIG. 16 is a diagram for an example of a method of selecting an application to be stored according to a prescribed drawing pattern on a virtual hand writing memo inputted via a stylus pen 500.

As depicted in FIG. 16 (a), assume that a user inputs a predetermined drawing pattern 1601 while inputting a virtual hand writing memo on a virtual memo pad 1501 (e.g., floor, paper and the like). The controller 180 recognizes the virtual hand writing memo inputted by the user. If the controller detects that there exists a prescribed pattern 1601 in the recognized hand writing memo, the controller stores the virtual hand writing memo using an application corresponding to the prescribed pattern 1601. In an example of FIG. 16, the application corresponding to the prescribed pattern 1601 is a memo application.

FIG. 16 (*b*) is a diagram for examples of applications corresponding to prescribed patterns. If the controller 180 recognizes the patterns depicted in FIG. 16 (*b*) in the virtual hand writing memo, the controller can control the hand writing memo to be stored using the application corresponding to the recognized pattern.

The aforementioned embodiment has explained a controlling method in the memo application, by which the present invention may be non-limited. In the following, a controlling method in a different application is explained.

Figure 17:
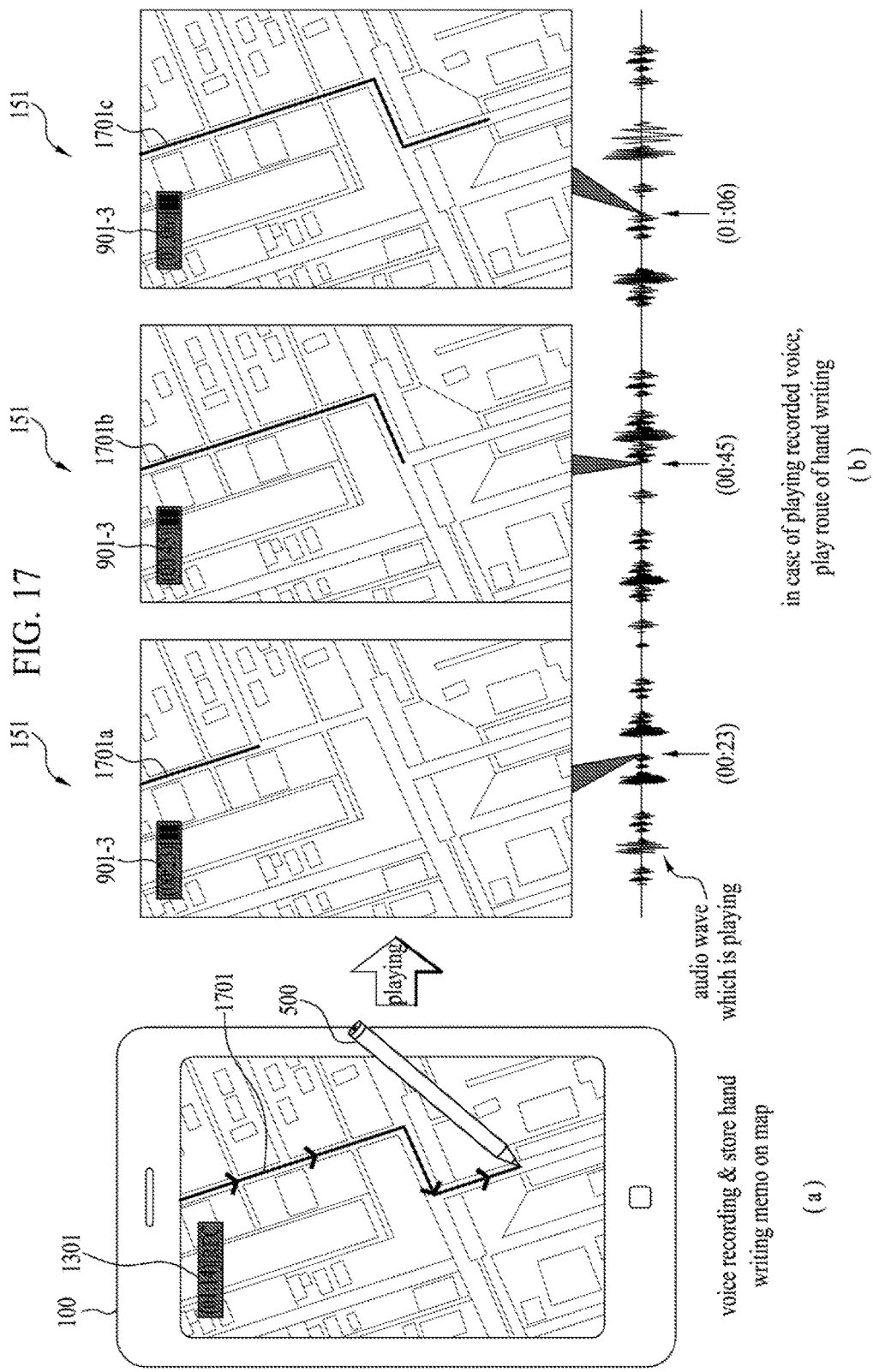
FIG. 17 is a diagram for a method of reading a hand writing memo stored on a map application while recording a voice memo using a stylus pen 500 at the same time according to one embodiment of the present invention.

FIG. 17 is a diagram for a method of reading a hand writing memo stored on a map application while recording a voice memo using a stylus pen 500 at the same time according to one embodiment of the present invention.

When a hand writing memo is stored together with a voice memo, one embodiment of the present invention proposes that the voice memo is played according to a writing route of the hand writing memo like a video does.

Referring to FIG. 17 (*b*), a recording indicator 1301 is outputted. As displayed in the recording indicator 1301, assume that the hand writing memo is simultaneously written on a map application in an arrow direction in accordance with a route 1701 as a recording is progressing.

FIG. 17 (*b*) is a diagram for a scheme of reading the written memo depicted in FIG. 17 (*a*). In the bottom of FIG. 17 (*b*), an audio wave of a playing audio is shown on the basis of a time axis. The hand writing memo according to the route is displayed in an order of 1701*a* (00:23), 1701*b* (00:45) and 1701*c* (01:06) in accordance with a prescribed time of the audio wave. In particular, the controller 180 may provide a reading of a memo where the extent of displaying the hand writing memo is synchronized with the extent of playing the voice memo. Although FIG. 17 (*b*) shows a part of frames only of a playing video of the hand writing memo, it is apparent that storing and playing can be done in a manner of increasing a frame rate.

Meanwhile, according to one embodiment of the present invention, in case of receiving voice memos from a plurality of persons (e.g., in case of having a meeting), a more effective controlling method can be provided. Regarding this, it shall be described with reference to FIG. 18 to FIG. 23 in the following.

Figure 18:
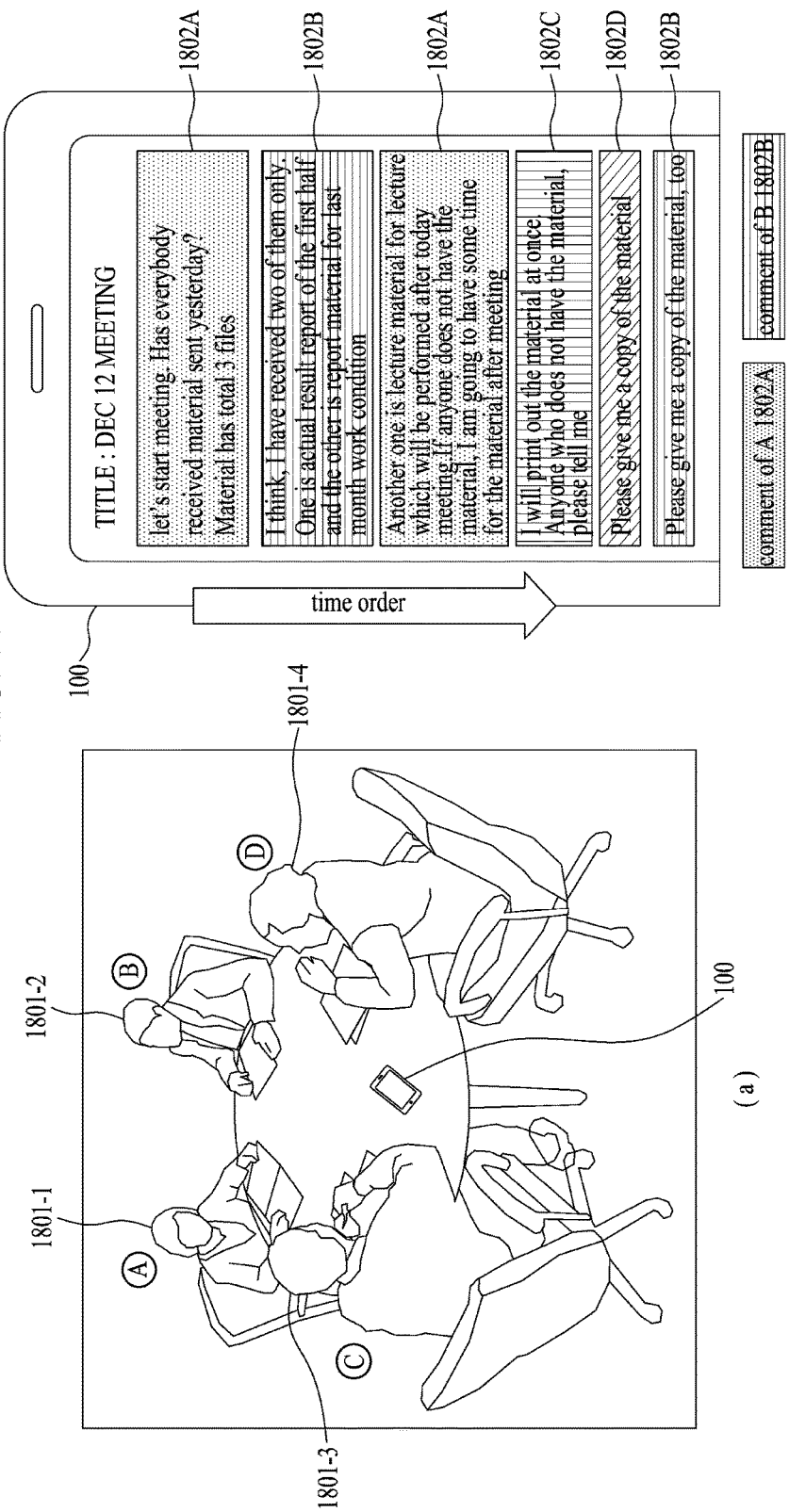
FIG. 18 is a diagram for a method of storing voice memos in a manner of simultaneously receiving the voice memos from a plurality of persons and reading the stored voice memos in minutes form.

FIG. 18 is a diagram for a method of storing voice memos in a manner of simultaneously receiving the voice memos from a plurality of persons and reading the stored voice memos in minutes form.

FIG. 18 (*a*) shows a situation that a meeting including a plurality of persons is progressing. A plurality of the persons may correspond to an A participant to a D participant. Assume that comments of a plurality of the persons are recorded by the mobile terminal 100 and the stylus pen 500. Meanwhile, according to one embodiment of the present invention, although a recording can be performed by a single mobile terminal 100 and a single stylus pen 500, the recording can also be performed by the single mobile terminal 100 and stylus pens 500 which are equipped according to the number of persons. In particular, the recording can be performed in a manner that a plurality of stylus pens 500 are connected with one mobile terminal 100.

FIG. 18 (*b*) shows a state that voice memos recorded from a plurality of persons are reading. The controller 180 converts the recorded voice memos into a text form, stores the converted memo of the text form, and can output the memo from the top to the bottom in a time order like minutes form.

In particular, according to one embodiment of the present invention, in case of reading the voice memos (the memos converted into the text form) recorded from a plurality of the persons, the controller 180 identifies each person in a manner of analyzing a voice of each person and can display the memos according to each person. For instance, as depicted in FIG. 18 (*b*), the controller 180 can display a voice memo inputted from the A participant, a voice memo inputted from the B participant, a voice memo inputted from the C participant and a voice memo inputted from the D participant as a first color 1802A, a second color 1802B, a third color 1802C and a fourth color 1802D, respectively.

Moreover, embodiment of the present invention proposes a controlling method capable of sharing and reading a material in a plurality of mobile terminals and inputting a voice memo and/or hand writing memo in the shared material.

Figure 19:
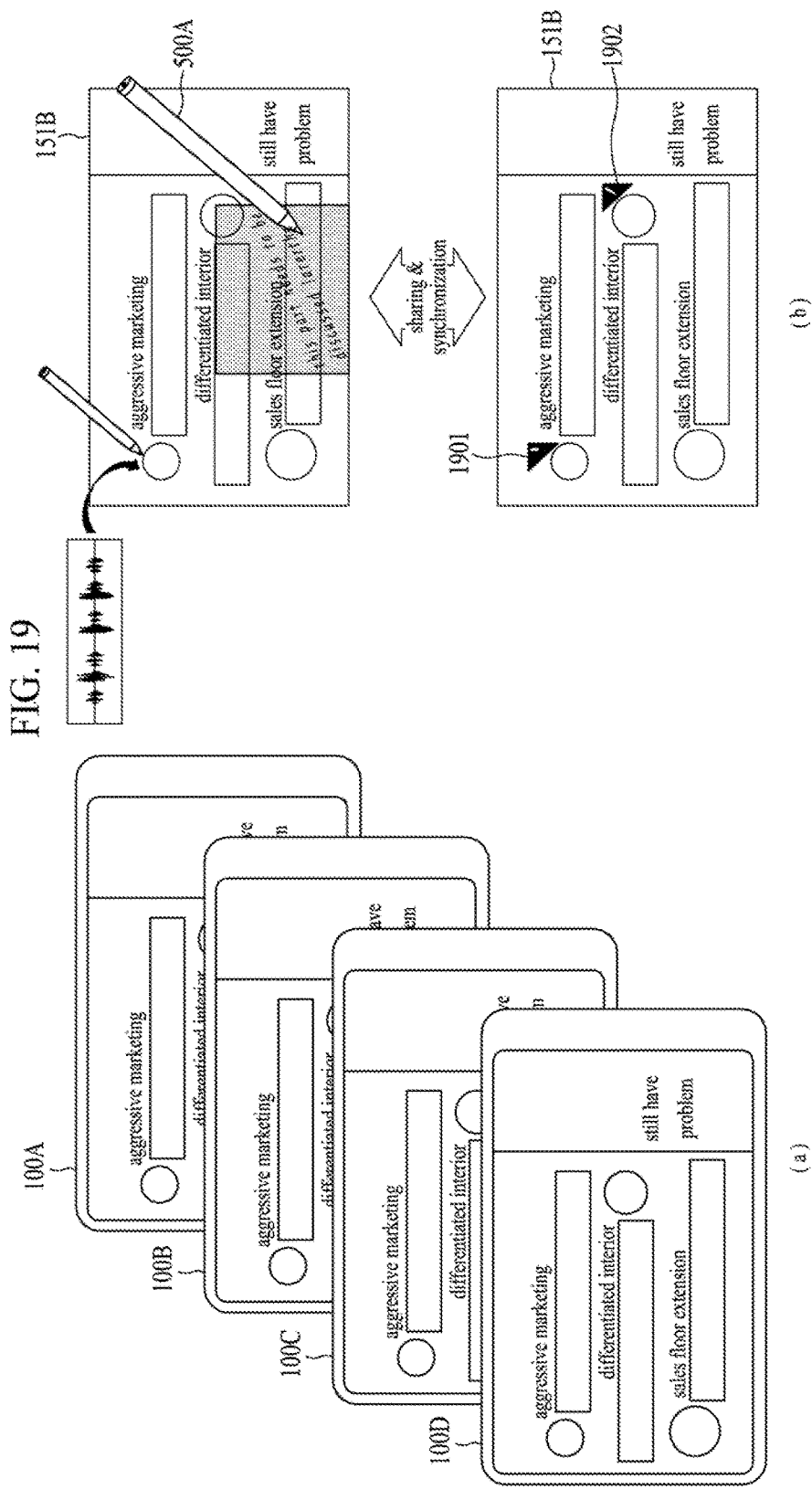
FIG. 19 and FIG. 20 are diagrams for a method of sharing a voice and a hand writing memo which are inputted in the middle of reading a material by a plurality of mobile terminals in a manner of sharing the material according to one embodiment of the present invention.
Figure 20:
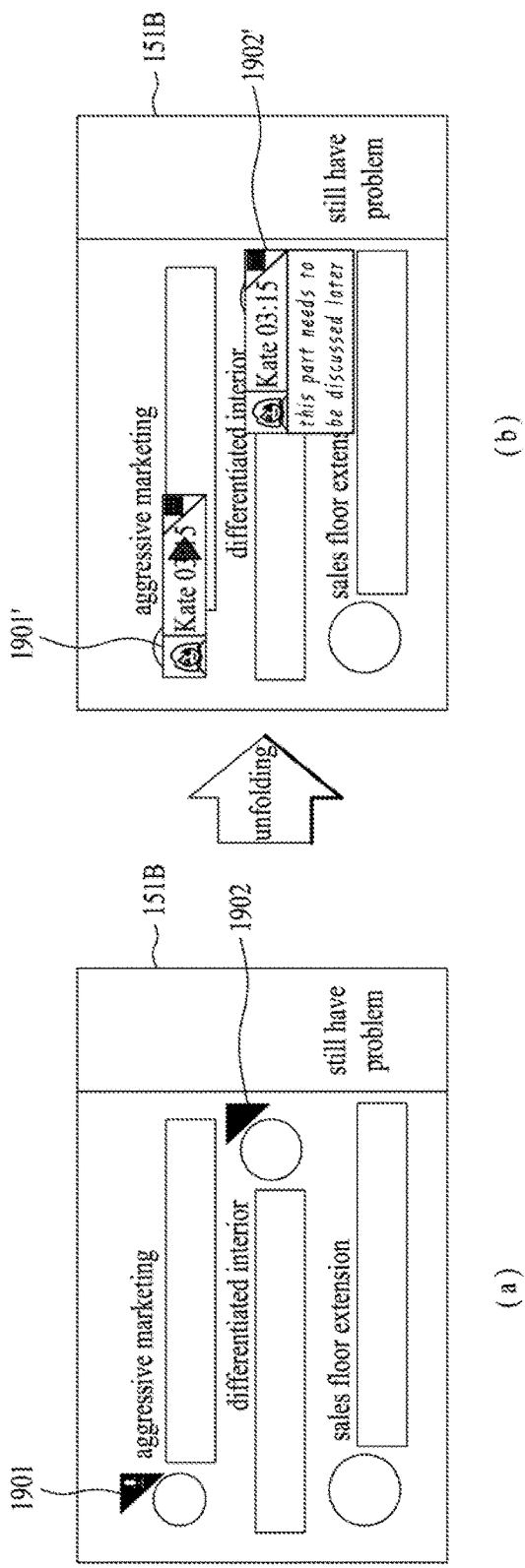

FIG. 19 and FIG. 20 are diagrams for a method of sharing a voice memo and a hand writing memo which are inputted in the middle of reading a material by a plurality of mobile terminals in a manner of sharing the material according to one embodiment of the present invention.

Referring to FIG. 19 (*a*), a first mobile terminal 100A to a fourth mobile terminal 100D are sharing a material. The top of FIG. 19 (*b*) shows a state of a touch screen 151A of the first mobile terminal 100A. Assume that a voice memo and a hand writing memo are inputted via the first mobile terminal 100A and a first stylus pen 500A of the first mobile terminal 100A.

If a voice/hand writing memo is inputted via the first mobile terminal 100A, remaining mobile terminals 100B to 100D, which are sharing a material with the first mobile terminal 100A, shares the inputted memo with the first mobile terminal and can synchronize the shared memo with a material outputted by the remaining mobile terminals. For instance, as depicted in FIG. 19 (*b*), the second mobile terminal 100B can display a voice memo indicator 1901 indicating that the voice memo inputted from the first mobile terminal 100A is synchronized and a hand writing memo indicator 1902 indicating that the hand writing memo is synchronized.

If an input for selecting the voice memo indicator 1901 or the hand writing memo indicator 1902 is received, the controller 180 can display the voice memo indicator or the hand writing memo indicator in a manner of changing the voice memo indicator or the hand writing memo indicator to a state capable of specifically reading the shared memo. In particular, if an input for selecting the voice memo indicator 1901 is received, the controller 180 can display the voice memo indicator in a manner of changing the voice memo indicator to a state 1901' capable of playing the shared voice memo. If an input for selecting the hand writing memo indicator 1902 is received, the controller 180 can display the hand writing memo indicator in a manner of changing the hand writing memo indicator to a state 1902' capable of reading the shared hand writing memo. The embodiment in relation to FIG. 20 has been explained based on the second mobile terminal 100B, it is apparent that the embodiment can be identically applied to a different mobile terminal as well.

The embodiment of FIG. 20 explains a method of reading a shared memo in a material shared by a plurality of mobile terminals. Yet, one embodiment of the present invention may be non-limited to this. One embodiment of the present invention further proposes a method of reading shared voice/hand writing memo all at once in a manner of collecting the shared voice/hand writing memo. Regarding this, it shall be described in detail with reference to FIG. 21 in the following.

Figure 21:
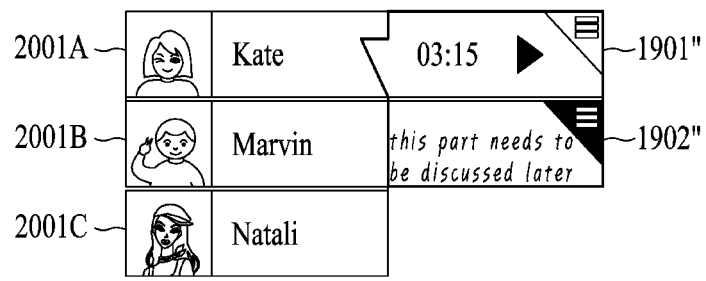
FIG. 21 is a diagram for a sharing memo list, which is used for reading voice/hand writing memos shared by a plurality of persons all at once, according to one embodiment of the present invention.

FIG. 21 is a diagram for a sharing memo list, which is used for reading voice/hand writing memos shared by a plurality of persons all at once, according to one embodiment of the present invention.

As mentioned in the foregoing description, the sharing memo list indicates a single list which is outputted in a manner that the voice/hand writing memos written by a plurality of persons are collected. For instance, as depicted in FIG. 21, in case that there exist participants such as 'Kate' 2001A, 'Marvin' 2001B, and 'Natali' 2001C, a user can read the memos in accordance with a participant. In particular, an input for selecting a participant is received, the controller 180 can display a list of a voice memo 1901" and a hand writing memo 1902" written by the selected participant. It is apparent that the embodiment can be identically applied to a different participant as well.

Meanwhile, a voice/hand writing memo, which has been written together with a recording of the minutes, can be provided with an output of the minutes. Regarding this embodiment, it shall be described with reference to FIG. 22.

Figure 22A:
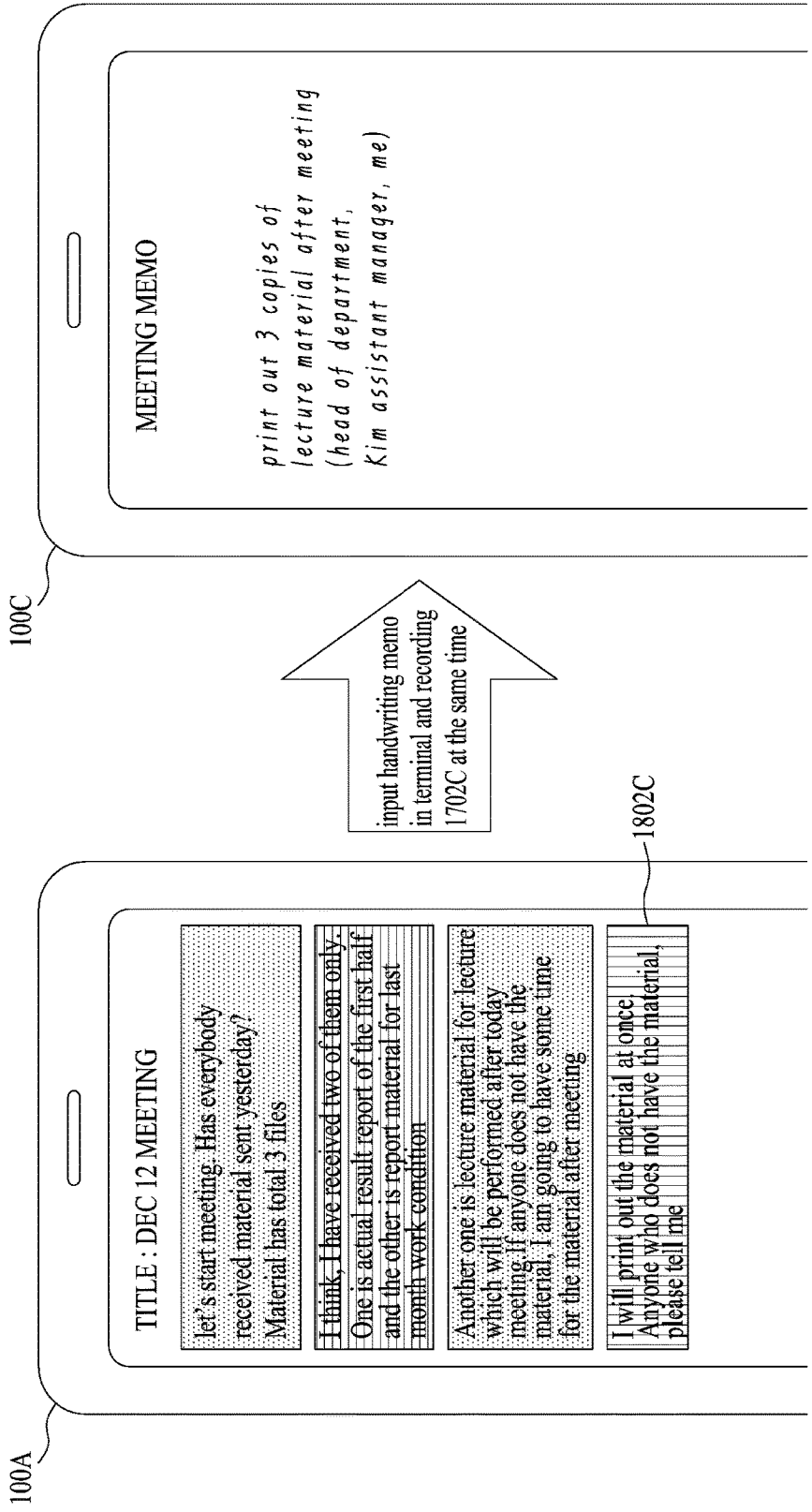
Figure 22B:
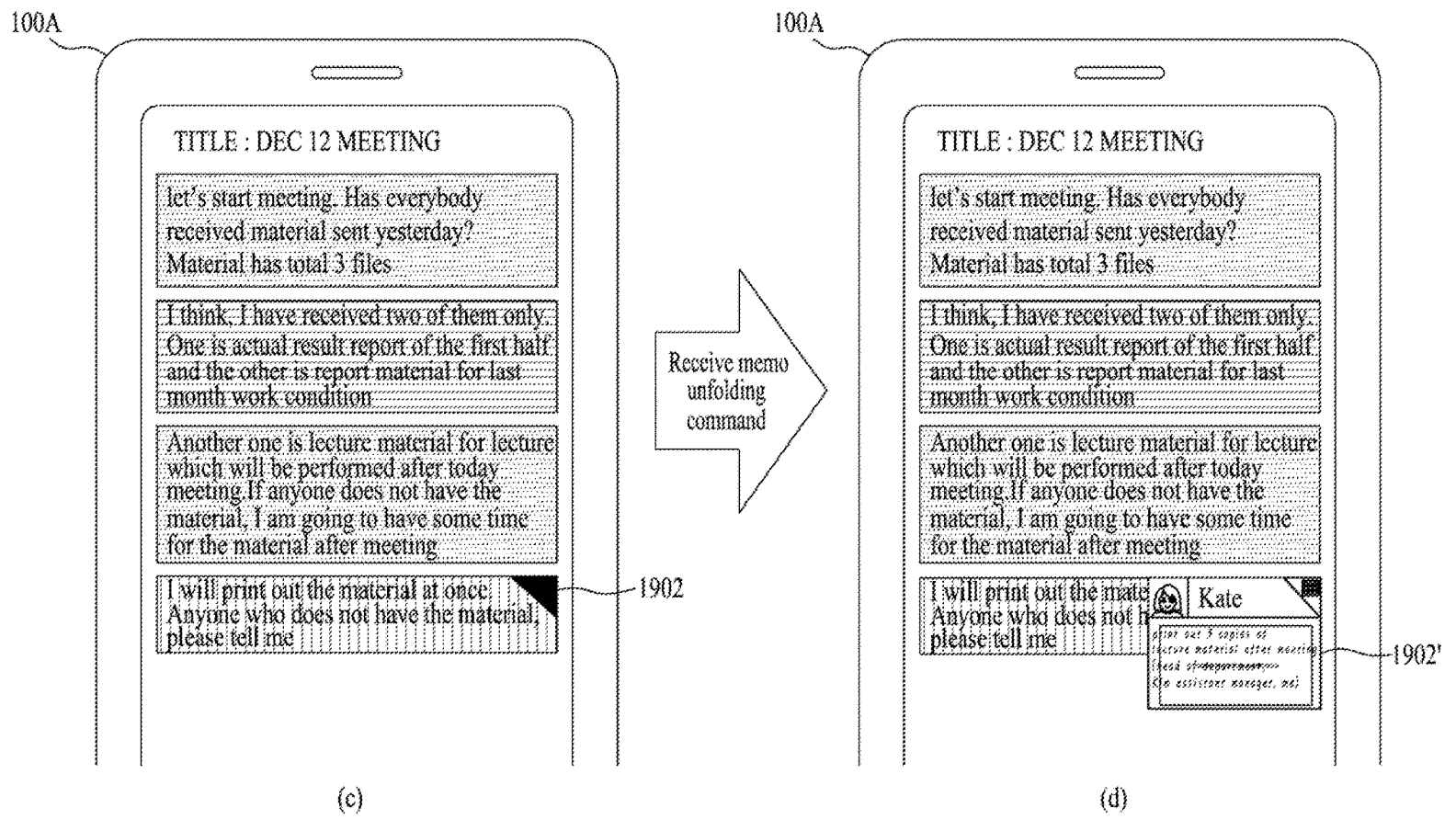

FIG. 22 and FIG. 23 are diagrams for a method of sharing a voice/hand writing memo on minutes according to one embodiment of the present invention. As the minutes mentioned earlier in FIG. 18 (*b*), assume that the minutes depicted in FIG. 22 (*a*) is recorded in a time order from the top to the bottom. FIG. 22 (*b*) shows a state of a third mobile terminal 100C. Assume that a hand writing memo inputted via the third mobile terminal 100C is inputted on a time identical to a time of a voice memo 1802C depicted in FIG. 22 (*a*).

FIG. 22 (*c*) shows a state of minutes read by the first mobile terminal 100A and a hand writing memo inputted by the third mobile terminal 100C is sharing. In particular, the first mobile terminal 100A displays a hand writing memo indicator 1902 indicating that there exists a shared hand writing memo. If an input for selecting the hand writing memo indicator 1902 is received, the controller 180 can display the hand writing memo indicator in a manner of changing the hand writing memo indicator to a state 1902' capable of reading the shared memo.

As depicted in FIG. 22 (*d*), the state 1902' can display a person who has made the memo while displaying the shared memo.

Meanwhile, one embodiment of the present invention proposes a method of searching for a key word between memos.

Referring to FIG. 23 (*a*), the controller 180 outputs an indicator 1902' for reading a shared memo while outputting minutes. In this case, if a prescribed keyword is selected on the shared memo, the controller 180 performs a search on the outputted minutes using the selected prescribed keyword and can output a search result. For instance, as depicted in FIG. 23 (*b*), searched prescribed keywords 2302-1 to 2302-3 can be distinctively displayed. In particular, as depicted in FIG. 23 (*a*), if 'lecture material' is selected as a prescribed keyword, the controller 180 performs a search operation with the selected 'lecture material'. As a result of performing the search operation, parts including the 'lecture material' can be distinctively displayed in the minutes as depicted in FIG. 23 (*b*).

FIG. 24 is a flowchart for a method of storing a voice memo according to one embodiment of the present invention.

In the step S2401, the controller 180 determines whether the stylus pen 500 is detached from the mobile terminal 100. If the stylus pen 500 is not detached from the mobile terminal 100, the flowchart ends. If it is determined that the stylus pen 500 is detached from the mobile terminal, the controller 180 may proceeds to the step S2402.

In the step S2402, the controller 180 establishes a connection between the mobile terminal 100 and the stylus pen 500. The step of establishing a connection can be performed in advance or can be performed later depending on a communication scheme being used. Or, if data transmission and reception can be performed without establishing a connection, the step may be omitted.

In the step S2403, the stylus pen 500 can record a voice memo via the s-microphone 603. The recorded voice memo can be directly transmitted to the mobile terminal 100 or can be stored in the s-memory 606 according to circumstance.

In the step S2404, if the controller 180 receives a pasting input for the voice memo recorded in the step S2430, the controller proceeds to the step S2405. Otherwise, the controller returns to the step S2403.

In the step S2405, the controller 180 receives the voice memo from the stylus pen 500. Meanwhile, the step S2404 and the step S2405 may be non-limited in order. In particular, the step S2405 may be performed prior to the step S2404. In this case, the controller 180 receives the voice memo from the stylus pen 500 in advance and can store the voice memo in the memory 160.

In the step S2406, the controller 180 selects a pasting mode. A selection of the pasting mode can be predetermined by a user or a system. Or, as mentioned earlier with reference to FIG. 7, the pasting mode can be selected by the user via a pop-up window 704 for the selection. If the user selects a pasting as text mode, the controller 180 may proceed to the step S2407. If the user selects an audio data pasting mode, the controller may proceed to the step S2409.

The step S2407 corresponds to an operation of the pasting as text mode. In the step S2407, the controller 180 converts the voice memo received in the step S2405 to a text form. In the step S2408, the controller 180 can perform a pasting operation for the text memo converted in the step S2407.

The step S2409 corresponds to an operation of the audio data pasting mode. In the step S2409, the controller 180 can paste a playback icon capable of playing an audio data.

Having performed the step S2408 or the step S2409, the controller 180 may end the flowchart.

Figure 25:
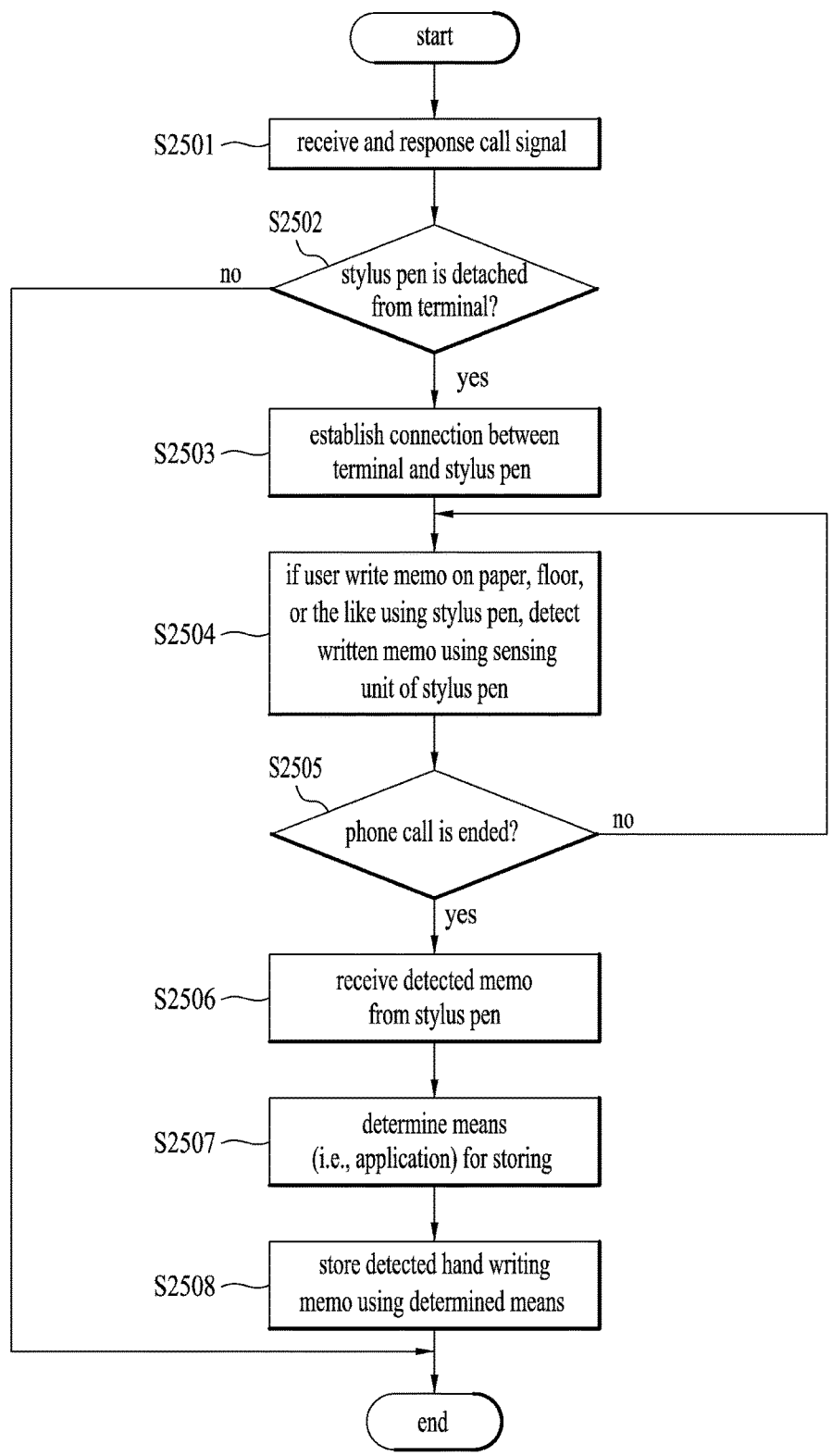
FIG. 25 is a flowchart for a method of writing a memo using a stylus pen 500 while talking over the phone according to a different embodiment of the present invention.

FIG. 25 is a flowchart for a method of writing a memo using a stylus pen 500 while talking over the phone according to a different embodiment of the present invention.

In the step S2501, the controller 180 receives a call signal and responses to the call signal. Or, the controller enters a calling state by sending the call signal.

In the step S2502, the controller 180 determines whether the stylus pen 500 is detached from the mobile terminal 100. If the stylus pen 500 is not detached from the mobile terminal 100, the controller 180 may end the flowchart.

In the step S2502, if it is determined that the stylus pen is detached from the mobile terminal, the controller 180 may proceed to the step S2503.

In the step S2503, the controller 180 establishes a connection between the mobile terminal 100 and the stylus pen 500. The step of establishing a connection can be performed in advance or can be performed later depending on a communication scheme being used. Or, if data transmission and reception can be performed without establishing a connection, the step may be omitted.

In the step S2504, the controller 180 receives a virtual hand writing memo from a user. In this case, the virtual hand writing memo corresponds to information received via the s-sensing unit 604 of the stylus pen 500. The virtual hand writing memo indicates the information that the user writes on a virtual memo pad (e.g., floor, paper, and the like) using the stylus pen 500.

In the step S2505, the controller 180 detects that a phone call is ended. If the phone call is not ended, the controller repeats the step S2504. If the phone call is ended, the controller proceeds to the step S2506.

In the step S2506, the controller 180 receives the virtual hand writing memo, which is detected in the step S2504, from the stylus pen 500.

In the step S2507, the controller 180 determines a means to store the virtual hand writing memo. In this case, the means to store the virtual hand writing memo includes a type of an application that stores the virtual hand writing memo.

The controller 180 outputs a selection pop-up window enabling a user to select an application and can determine an application used for storing the virtual hand writing memo according to a selection of the user (determination according to the method mentioned earlier in FIG. 16).

As a different method, the controller 180 identifies the virtual hand writing memo, detects a prescribed pattern included in the virtual hand writing memo, and may be then able to determine an application used for storing a virtual hand writing input according to the prescribed pattern.

In the step S2508, the controller 180 stores the virtual hand writing memo with the means determined in the step S2507. Having performed the step S2508, the controller may end the flowchart.

Advantages and effectiveness of a mobile terminal according to the present invention and a method of controlling therefor are explained in the following.

According to at least one of the embodiments of the present invention, a function of the mobile terminal can be expanded via a stylus pen.

According to at least one of the embodiments of the present invention, when a memo is recorded via the mobile terminal, user interface environment where convenience has been enhanced can be provided.

It will be apparent to those skilled in the art that the present invention can be specified into other form(s) without departing from the spirit or scope of the inventions.

The above-described methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet). And, the computer can include the control unit 180 of the terminal.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal, comprising:
   a detachable stylus pen including a microphone and a memory;
   a touch screen configured to output an execution screen of an application;
   a wireless communication unit configured to receive a voice signal from the stylus pen, the voice signal generated in response to at least one voice received via the microphone while text is input onto the execution screen according to movement of the stylus pen that is detached from the mobile terminal, and the generated voice signal stored in the memory of the stylus pen such that the received at least one voice is stored as a recorded voice memo; and
   a controller configured to:
      execute the application;
      cause the touch screen to display text corresponding to at least a portion of the received voice signal at a specific position of the execution screen in response to selection of the specific position by the detached stylus pen;
      cause the touch screen to display a pop-up window including a list of a plurality of texts, each text in the list corresponding to a respective one of a plurality of voice data included in the at least one voice and one of the plurality of texts displayed distinctively over the rest of the plurality of texts in the list, such that one of the plurality of texts is selected from the list; and
      cause the touch screen to display a recording indicator indicating that the voice memo is being recorded, the recording indicator displayed while the text is input onto the execution screen,
   wherein the distinctively displayed one of the plurality of texts in the list is recommended based on the specific position for its closest relationship with the specific position among the plurality of texts in the list.

2. The mobile terminal of claim 1, further comprising a memory, wherein the controller is further configured to:
   store the received voice signal in the memory of the mobile terminal; and
   cause the touch screen to display a playback icon for allowing playback of the voice signal stored in the memory of the mobile terminal in response to selection of the playback icon.

3. The mobile terminal of claim 1, wherein:
   the at least one voice comprises voices of a plurality of persons; and
   the controller is further configured to cause the touch screen to display a plurality of texts, each text corresponding to a respective one of the voices of the plurality of persons.

4. The mobile terminal of claim 1, wherein the controller is further configured to cause the touch screen to output a list of candidate words for replacing a word of the displayed text in response to selection of the word.

5. The mobile terminal of claim 4, wherein the candidate words are arranged in a specific order according to their degrees of similarity to a signal section of the voice signal corresponding to the word.

6. The mobile terminal of claim 1, wherein the controller is further configured to cause the touch screen to display a second pop-up window including a text pasting mode for converting the received voice signal to the text to be displayed and an audio data pasting mode for causing displaying of a playback icon for playing the received voice signal such that one of the text pasting mode and the audio data pasting mode is selected via the second pop-up window.

7. The mobile terminal of claim 6, wherein the controller is further configured to convert the received voice signal to the text in response to selection of the text pasting mode from the second pop-up window such that the converted text is displayed at the specific position of the execution screen.

8. The mobile terminal of claim 6, wherein the controller is further configured to cause the touch screen to display the playback icon at the specific position of the execution screen in response selection of the audio data pasting mode from the second pop-up window.

9. The mobile terminal of claim 1, wherein the executed application is a handwriting memo application in which the stylus pen is used for text input on the execution screen.

10. The mobile terminal of claim 1, wherein a time corresponding to the stored voice signal is associated with a time corresponding to the text input.

11. The mobile terminal of claim 10, wherein a time corresponding to the distinctively displayed one of the plurality of texts most closely matches with a time corresponding to the specific position that corresponds to a position in the input text.

12. The mobile terminal of claim 1, wherein a position of the displayed recording indicator is changed progressively as additional text is input onto the execution screen.

13. The mobile terminal of claim 12, wherein the controller is further configured to cause the touch screen to display a playback icon instead of the recording indicator when the recording of the voice memo is completed.

14. A method of controlling a mobile terminal comprising a detachable stylus pen including a microphone and a memory, a touch screen, and a wireless communication unit, the method comprising:
   outputting an execution screen of an application via the touch screen;
   receiving a voice signal from the stylus pen via the wireless communication unit, the voice signal generated in response to at least one voice received via the microphone while text is input onto the execution screen according to movement of the stylus pen that is detached from the mobile terminal, and the generated voice signal stored in the memory of the stylus pen such that the received at least one voice is stored as a recorded voice memo;
   displaying text corresponding to at least a portion of the received voice signal at a specific position of the execution screen in response to selection of the specific position by the detached stylus pen;
   displaying a pop-up window including a list of a plurality of texts, each text in the list corresponding to a respective one of a plurality of voice data included in the at least one voice and one of the plurality of texts displayed distinctively over the rest of the plurality of texts in the list, such that one of the plurality of texts is selected from the list; and
   displaying a recording indicator indicating that the voice memo is being recorded, the recording indicator displayed while the text is input onto the execution screen,
   wherein the distinctively displayed one of the plurality of texts in the list is recommended based on the specific position for its closest relationship with the specific position among the plurality of texts in the list.

15. The method of claim 14, wherein the mobile terminal further comprises a memory and the method further comprises:
   storing the received voice signal in the memory of the mobile terminal; and
   displaying a playback icon for allowing playback of the voice signal stored in the memory of the mobile terminal in response to selection of the playback icon from the touch screen.

16. The method of claim 14, wherein:
   the at least one voice comprises voices of a plurality of persons; and
   the method further comprises displaying a plurality of texts, each text corresponding to a respective one of the voices of the plurality of persons.

17. The method of claim 14, further comprising outputting a list of candidate words for replacing a word of the displayed text in response to selection of the word.

18. The method of claim 17, wherein the candidate words are arranged in a specific order according to their degrees of similarity to a signal section of the voice signal corresponding to the word.

* * * * *